United States Patent
Tagusa

(10) Patent No.: US 6,226,061 B1
(45) Date of Patent: May 1, 2001

(54) LIQUID CRYSTAL DISPLAY DEVICE HAVING PHASE DIFFERENT PLATES

(75) Inventor: Yasunobu Tagusa, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/047,115

(22) Filed: Mar. 24, 1998

(30) Foreign Application Priority Data

Mar. 25, 1997 (JP) .................................................. 9-072257
Feb. 17, 1998 (JP) ................................................. 10-033444

(51) Int. Cl.⁷ ....................... G02F 1/1333; G02F 1/1347; G02F 1/1343
(52) U.S. Cl. ............................. 349/84; 349/141; 349/169; 349/188; 349/75
(58) Field of Search ................................ 349/84, 75, 141, 349/169, 181, 188, 117, 120

(56) References Cited

U.S. PATENT DOCUMENTS

| | | | |
|---|---|---|---|
| 5,212,819 | * 5/1993 | Wada | 359/63 |
| 5,506,706 | 4/1996 | Yamahara et al. | 359/73 |
| 5,583,679 | * 12/1996 | Ito et al. | 349/118 |
| 5,641,974 | 6/1997 | den Boer et al. | 257/59 |
| 5,737,046 | * 4/1998 | Moriwaki et al. | 349/117 |
| 5,774,197 | * 6/1998 | Nakamura | 349/117 |
| 5,793,455 | * 8/1998 | Nakamura | 349/96 |
| 5,805,253 | * 9/1998 | Mori et al. | 349/118 |
| 5,895,106 | * 4/1999 | VanderPloeg et al. | 349/120 |
| 5,986,733 | * 11/1999 | Winker et al. | 349/120 |
| 6,097,452 | 8/2000 | Shimada et al. | 349/39 |

FOREIGN PATENT DOCUMENTS

| | | |
|---|---|---|
| 0 851 269 A1 | 12/1997 | (EP) . |
| 55-600 | 1/1980 | (JP) . |
| 58-172685 | 10/1983 | (JP) . |
| 5-210099 | 8/1993 | (JP) . |
| 5-313159 | 11/1993 | (JP) . |
| 6-230422 | 8/1994 | (JP) . |
| 6-242437 | 9/1994 | (JP) . |
| 7-64096 | 3/1995 | (JP) . |

OTHER PUBLICATIONS

"Challenge to Super–Resolution in CRT By Displaying One Pixel With Plural Pixel Regions" (Nikkei Microdevices, published on Jul. 1, 1997, pp. 108–110).

Radler et al, "Cylotene Advanced Electronics Resins for High Aperture AMLCD Applications". SID 96 Applications Digest pp. 33–36, 1996.*

* cited by examiner

Primary Examiner—Kenneth Parker
Assistant Examiner—Mike Qi
(74) Attorney, Agent, or Firm—David G. Conlin; Steven M. Jensen; Dike, Bronstein, Roberts and Cushman, LLP

(57) ABSTRACT

A liquid crystal display (LCD) device is composed of (1) an LCD element having (i) a glass substrate on which a flat portion including pixel electrodes and a flat portion including switching elements, wires, and the like are laminated with interlayer insulating films therebetween, each interlayer insulating film being an organic film with an optical transmittance of not less than 95 percent with respect to light with a peak wavelength and (ii) a liquid crystal layer made of liquid crystal whose refractive index anisotropy $\Delta n(450)$ with respect to light with a wavelength of 450 nm and whose refractive index anisotropy $\Delta n(650)$ with respect to light with a wavelength of 650 nm satisfy a condition that a difference $\Delta n(450)-\Delta n(650)$ between them is set so as to be in a range of 0 to 0.01, and (2) a phase difference plate whose refractive index anisotropy is negative (na=nc>nb) and whose index ellipsoids are inclined substantially throughout the phase difference plate. By thus arranging the LCD device, phase differences depending on viewing angles which tend to occur to the LCD element are eliminated whereby the viewing angle dependence of the LCD device is suppressed, while the structure of the pixel substrate is improved, and as a result, reversal influences to a display screen are avoided.

14 Claims, 14 Drawing Sheets

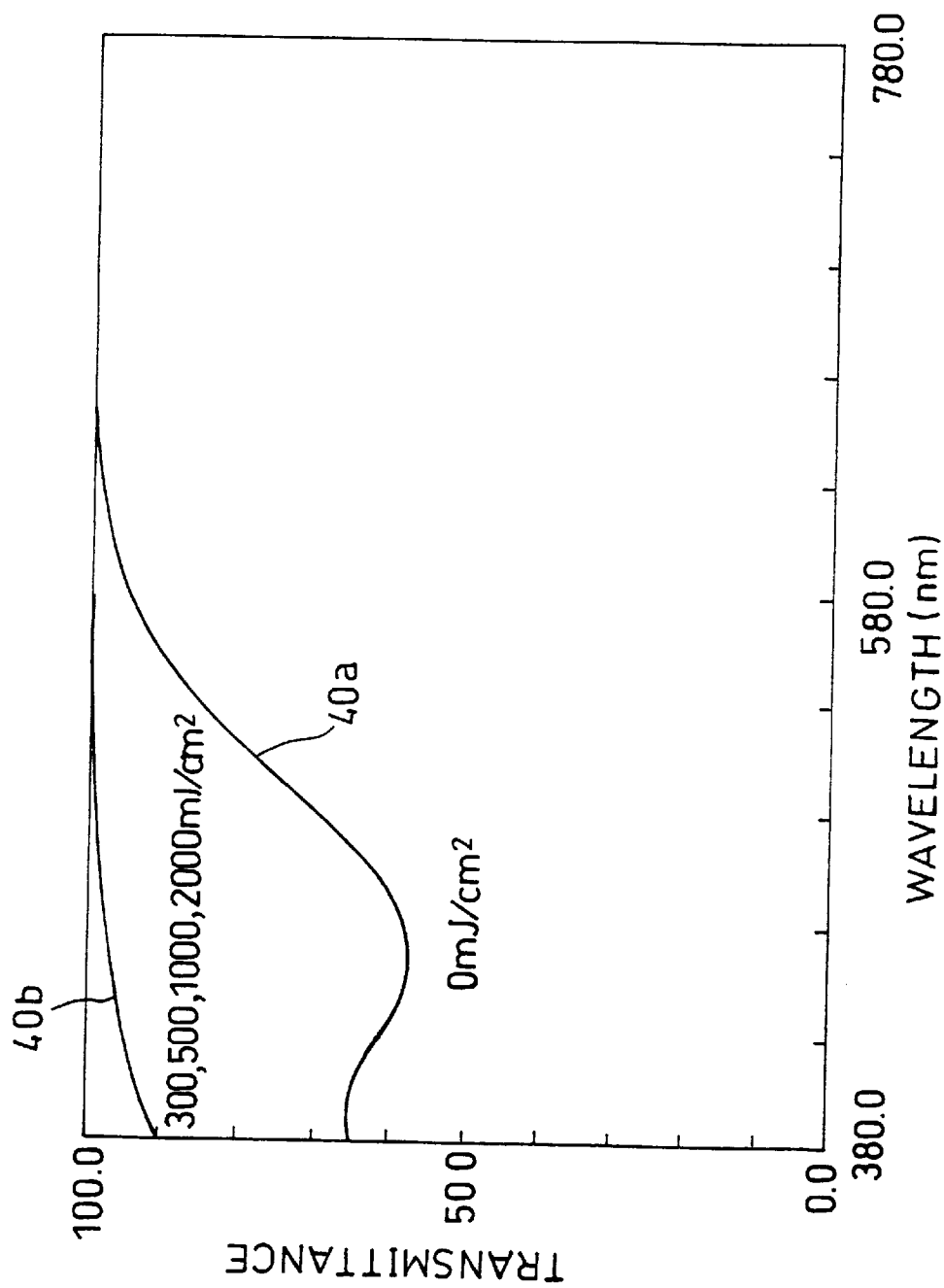

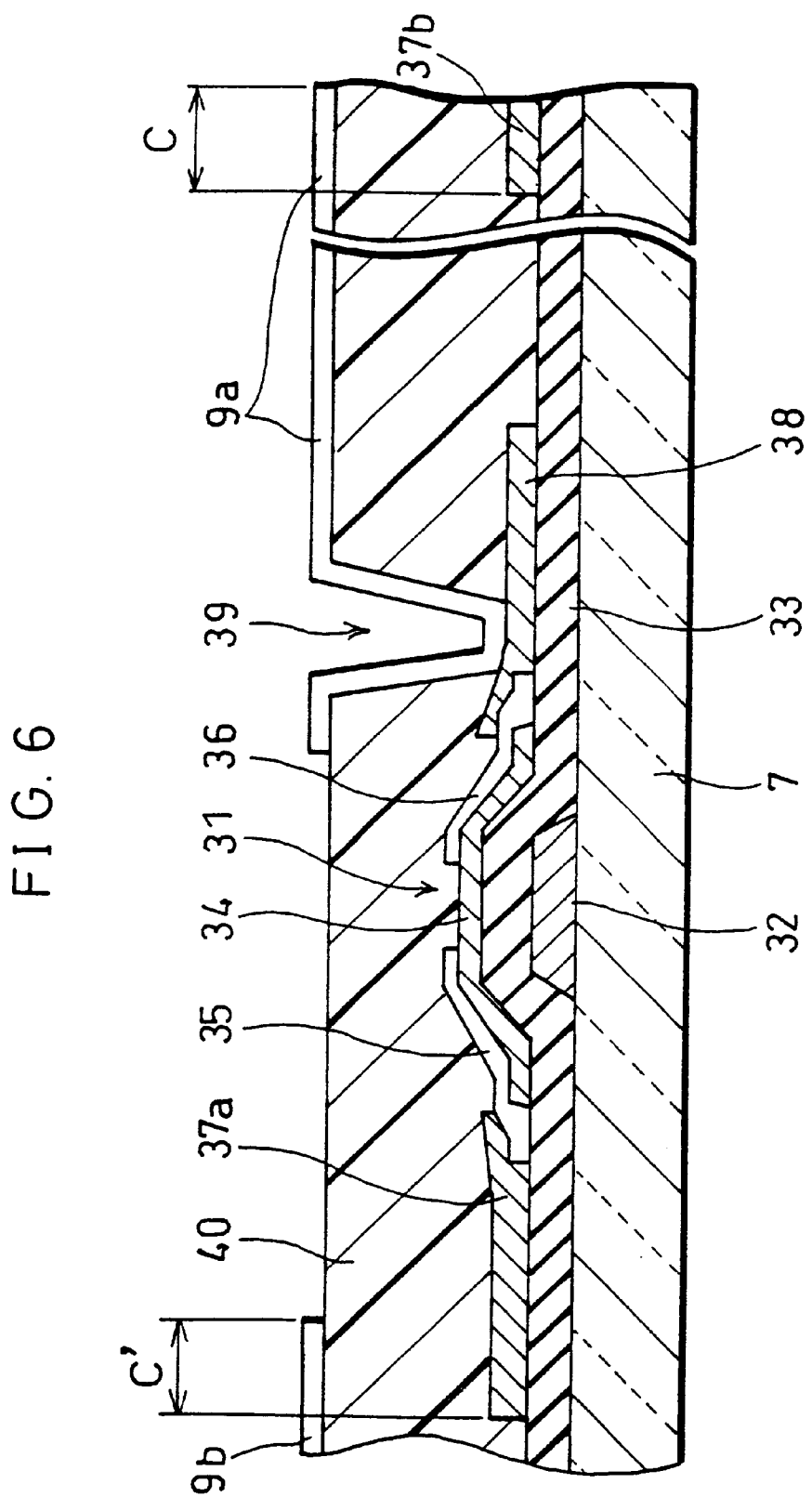

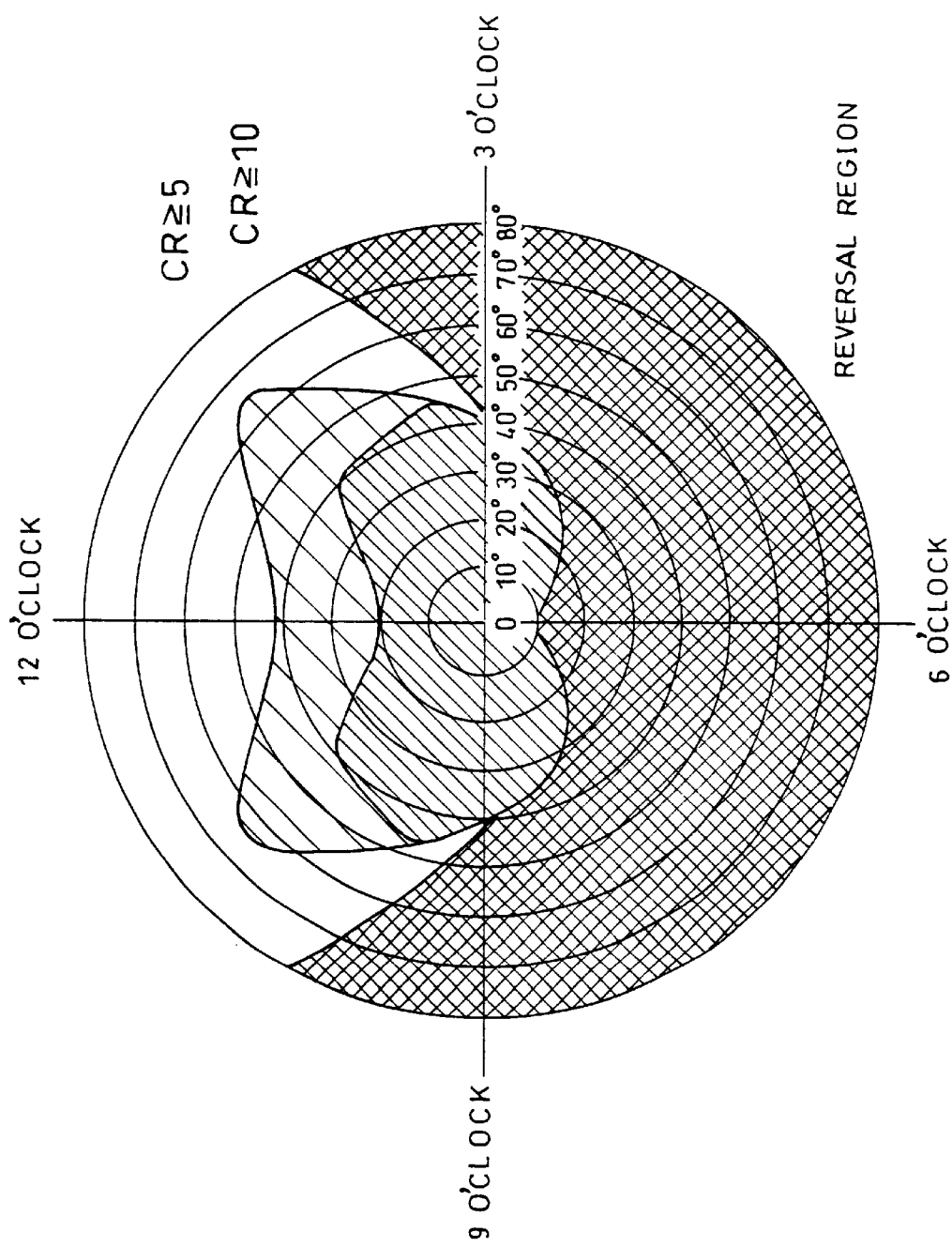

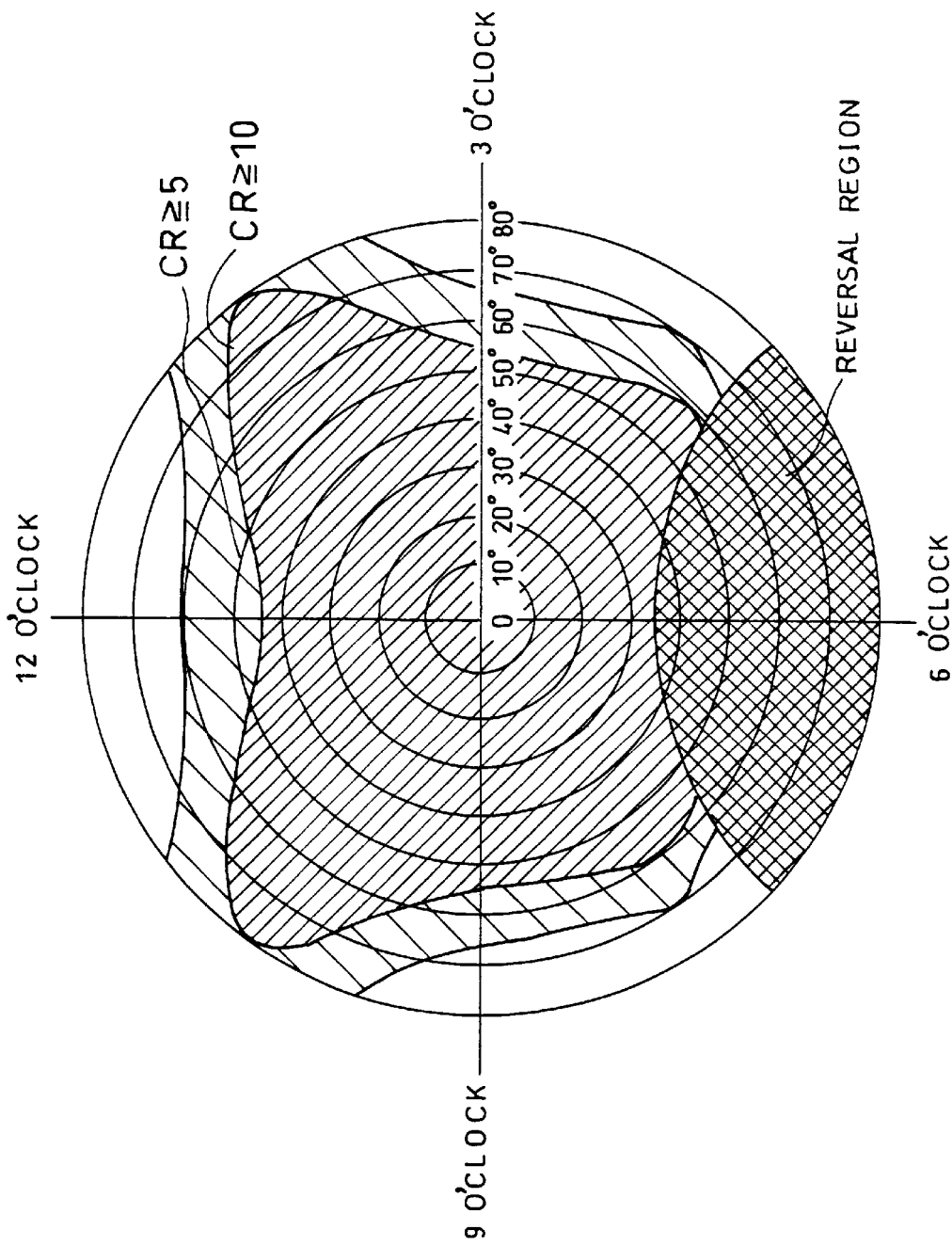

LIQUID CRYSTAL DISPLAY DEVICE HAVING PHASE DIFFERENT PLATES

FIELD OF THE INVENTION

The present invention relates to a liquid crystal display device. More specifically, the present invention relates to a liquid crystal display device equipped with switching elements such as thin film transistors (hereinafter referred to as TFTs) which improve visibility properties and display properties of a display screen and make a display not inferior to a display of a CRT (cathode-ray tube) display device.

BACKGROUND OF THE INVENTION

Conventionally, a liquid crystal display (LCD) device using a nematic-type liquid crystal display element has been widely used as a digit-segment-type liquid crystal display device for use in a watch or a electric calculator. Recently it has come to be used as a display device for use in a word processor, a computer, a navigation system, or the like.

Among such LCD devices, in particular, an active matrix LCD device wherein active elements such as TFTs are used as switching elements and pixels are arranged in a matrix form is widely used and known. The LCD device has advantages such as having a drastically reduced thickness (depth), consuming less power, and being easily modified to a full-color display device, as compared with the CRT display device. Therefore, the demand for the LCD device is increasing in various fields such as those of personal computers, various monitors, potable TVs, and cameras. However, since such a conventional LCD device is inferior to the CRT display device in a viewing angle range, luminance, color reproduction, and the like, improvement is eagerly desired in respect to these aspects.

The active matrix LCD device has a transparent active matrix substrate, on which a plurality of pixel electrodes 51 for applying voltages to a liquid crystal layer are arranged in a matrix form as shown in FIG. 11. As active elements which are switching means for selectively driving the pixel electrodes 51, thin-film transistors (TFTs) 52 are formed on the substrate and are connected with the pixel electrodes 51. Further, in the case where the color display is conducted, color filter layers of red, green, blue, and other colors are provided, though not shown, on the active matrix substrate or a counter substrate, in addition to the foregoing arrangement.

Gate electrodes of the TFTs 52 are connected with scanning lines 53, while source electrodes of the TFTs 52 are connected with signal lines 54. The scanning lines 53 and the signal lines 54 are provided so as to run beside the pixel electrodes 51 arranged in matrix and orthogonally cross each other. The TFTs 52 are driven in response to input of gate signals through the scanning lines 53. Upon the driving of the TFTs 52, data signals (display signals) are supplied to the pixel electrodes 51 through the signals lines 54 and the TFTs 52.

Furthermore, drain electrodes of the TFTs 52 are connected with the pixel electrodes 51 and additional capacitors 55. Counter electrodes provided vis-a-vis the additional capacitors 55 with an insulating layer therebetween are connected with common lines 56. The additional capacitors 55 are intended to hold voltages to be applied to the liquid crystal layer.

In the active matrix LCD device, the liquid crystal layer is provided between the active matrix substrate and the counter substrate vis-a-vis to the active matrix substrate. In other words, the liquid crystal layer is provided between the pixel electrodes 51 on the active matrix substrate and the counter electrodes provided on the counter substrate, thereby constituting a liquid crystal capacitor. The additional capacitors 55 are connected in parallel with the liquid crystal capacitor.

To explain each TFT 52 in more detail, as shown in FIG. 12, a gate electrode 62 is formed on a transparent insulating substrate 61, and a gate insulating film 63 is formed so as to cover the gate electrode 62. On the gate electrode 62, a semiconductor film 64 is provided with the gate insulating film 63 interlaminated therebetween. On a center portion of the semiconductor film 64, there is provided a channel protective layer 65. On source section sides of the channel protective layer 65 and the semiconductor thin film 64, a source electrode 66a composed of a microcrystal $n^+$-silicon layer is formed, while on drain section sides of the same, a drain electrode 66b composed of a microcrystal $n^+$-silicon layer is formed.

The source electrode 66a is connected with a metal layer 67a serving as a source wire, while the drain electrode 66b is connected with a metal layer 67b serving as a drain wire. A surface of the TFT 52 is covered with an interlayer insulating film 68, and a transparent conductive film serving as the pixel electrode 51 is formed thereon. The pixel electrode 51 is connected with the metal layer 67b as the drain wire of the TFT 52 through a contact hole 69. Further, on the pixel electrode 51, an alignment film (not shown) for aligning the liquid crystal is uniformly provided substantially throughout a whole display region including marginal portions.

As described above, the interlayer insulating film 68 is provided between the scanning lines 53 and the signal lines 54 on one hand and the transparent conductive films serving as the pixel electrodes 51 on the other hand. Therefore, the pixel electrodes 51 can be laminated on the scanning lines 53 and the signal lines 54 with the interlayer insulating film 68 interlaminated therebetween. Such arrangement is disclosed by, for example, the Japanese Publication for Laid-Open Patent Application No.58-172685/1983 (Tokukaisho 58-172685). With the arrangement, a pixel aperture ratio of the LCD device is enhanced, and disclination of the liquid crystal is suppressed by shielding an electric field due to signals conducted through the signal lines 54 with the use of the interlayer insulating film 68.

As the interlayer insulating film 68, an inorganic thin film made of SiN or the like has conventionally been used. The SiN film is formed by, for example, the CVD (chemical vapor deposition) method to a thickness of about 500 nm.

Here, liquid crystal molecules used as the liquid crystal layer have a refractive index anisotropy Δn, and the liquid crystal molecules are aligned with an inclination with respect to the active matrix substrate and the counter substrate sandwiching the liquid crystal molecules. Therefore, a contrast of a displayed image alters depending on a viewing direction or a viewing angle of an observer, whereby aggravating the viewing angle dependence.

Regarding the foregoing problem, a liquid crystal display method for an LCD device of the twisted-nematic (hereinafter referred to as TN) type, which is particularly often used among the LCD devices of the nematic type, is explained as follows. As shown in FIG. 13, when a voltage for a half-tone display is applied to an LCD element 71 of the TN type, each liquid crystal molecule 72 slightly raises an end thereof. Here, a linearly polarized light 75 running in a normal direction of surfaces of substrates 73 and 74, and linearly polarized lights 76 and 77 running in a direction inclining with respect to the normal direction cross the liquid crystal molecules 72 at different angles. Since the liquid crystal molecules 72 have the refractive index anisotropy Δn as described above, an ordinary light and an extraordinary light occur when the linearly polarized lights 75, 76, and 77 directed in the respective directions pass through the liquid crystal molecules 72. T he linearly polarized lights 75, 76, and 77 are converted to elliptically polarized lights in accordance with phase differences between the ordinary light and the extraordinary light, respectively, thereby causing the viewing angle dependence.

Inside the liquid crystal layer, among the liquid crystal molecules 72, those around a mid point between the substrates 73 and 74, those near the substrate 73, and those near the substrate 74 have different tilt angles. Besides, those near the substrate 73 are twisted with respect to those near the substrate 74 through an angle of 90° a round an axis directed in the normal direction. For these reasons, when passing through the liquid crystal layer, the linearly polarized lights 75, 76, and 77 are affected by various birefringence effects depending on the directions and angles thereof, thereby exhibiting complicated viewing angle dependence.

As concrete phenomena of the viewing angle dependence, the following phenomena occurs, in the case where an LCD device is disposed so that better visibility is obtained when viewed \in a direction inclined toward a top side\ of the screen, as shown in FIG. 14: (1) as the viewing direction is inclined from the normal direction of the screen to a normal viewing angle direction which is a direction inclined to a bottom side of the display screen, the display becomes discolored (hereinafter referred to as discoloring) when the viewing angle exceeds a certain degree, or black and white reverse (hereinafter referred to as reversal); and (2) as the viewing direction is inclined to an anti-viewing angle direction which is a direction inclined to a top side of the screen, the contrast drastically deteriorates.

On top of that, the aforementioned LCD device has a drawback in that the angle of visibility narrows as the display screen expands. In viewing a large LCD screen at a short distance from the front, colors displayed in an upper part and in a lower part sometimes differ due to an influence of the viewing angle dependence. This is because an angle of vision for viewing the whole screen becomes greater, whereby viewing an edge portion of the large screen becomes identical to viewing a smaller LCD screen in a direction further inclined.

To suppress the viewing angle dependence, to insert a phase difference plate (phase difference film) as an optical element having an optical anisotropy between the LCD element and one polarizing plate has been proposed (see, for example, the Japanese Publication for Laid-Open Patent Application No.55-600/1980 (Tokukaisho 55-600)).

According to this method, light converted from the linearly polarized light to the elliptically polarized light as described above is caused to pass through the phase different plate(s) provided on one side or both the sides of the liquid crystal layer, so as to be again converted to linearly polarized light, whereby a phase difference between ordinary light and extraordinary light occurring to the viewing angle is compensated, and suppression of the viewing angle dependence is enabled. Therefore, to conduct this method, it is necessary to adjust not only properties of the phase difference plate but also those of the liquid crystal layer, i.e., the LCD element.

Then, to further suppress the viewing angle dependence, an LCD device arranged as follows is proposed (see the Japanese Publication for Laid-Open Patent Application No.5-313159/1993 (Tokukaihei 5-313159)): the LCD device has (i) an LCD element which is arranged so that a retardation Δn·d which is a product of a refractive index anisotropy Δn of a liquid-crystalline material of the liquid crystal layer and a thickness d of the liquid crystal layer is in a range between 200 nm to 500 nm and (ii) a phase difference plate provided between the LCD element and a polarizing plate, the phase difference plate being arranged so that a main refractive index direction of its index ellipsoid is parallel with a normal direction of a surface of the phase difference plate.

This arrangement is characterized in that the properties of the phase difference plate and the LCD element are desirably set not only as described above but also so that a rubbing direction of an alignment film constituting the LCD element, a slow axis direction of the phase difference plate, and a transmission axis of the polarizing plate are parallel, thereby ensuring further suppression of the viewing angle dependence.

Even in the case where such a phase difference plate is used, reversal which occurs when viewed in the normal viewing angle direction is still recognized in a narrow angle range.

Furthermore, to use another arrangement wherein a main refractive index direction of the index ellipsoid is inclined with respect to the normal direction of the surface of the phase difference plate has been also proposed (see the Japanese Publication for Laid-Open Patent Application No.6-75116/1994 (Tokukaihei 6-75116)). In this arrangement, either of phase difference plates of the following two types is used.

One is arranged so that among three main refractive indexes of the index ellipsoid, the smallest main refractive index has a direction parallel with the surface of the phase difference plate, and one of the rest two main refractive indexes is inclined at an angle θ with respect to the surface while the other is inclined at an angle θ with respect to a normal direction of the surface of the phase difference plate, where θ satisfies 20°≦θ≦70 °.

The other is arranged so that: (1) the phase difference plate does not have a refractive index anisotropy around its surface; (2) a main refractive index nb in a normal direction of the surface of the phase difference plate and main refractive indexes na and nc parallel with the surface of the phase difference plate satisfy na=nc>nb, that is, the phase difference plate is negatively uniaxial; and (3) the index ellipsoid is inclined by rotating the main refraction index nb direction in a clockwise direction or in an anti-clockwise direction around an axis which is either of the directions of the main refractive indexes na or nc so that the index ellipsoid shifts from a state of being parallel with the normal direction of the phase difference plate surface to a state of being inclined to the same.

Regarding the foregoing two types of phase difference plates, the former may be uniaxial or biaxial. As to the latter, instead of using a single phase difference plate, a combination of two phase difference plates whose main refractive index nb directions resulting on the inclination described above have an angle of 90° therebetween may be used.

In the LCD device thus arranged so as to have at least one such phase difference plate between the LCD element and the polarizing plate, the viewing angle dependence is suppressed to some extent. As shown in FIG. 15 which illustrates an example of this, improvement regarding the contrast and the suppression of reversal is achieved in this case, as compared with the case of FIG. 14: the contrast is improved substantially in all directions, and reversal in the normal viewing angle direction is also further suppressed, not occurring till the viewing angle exceeds about 350.

As another means to suppress the viewing angle dependence, an arrangement wherein regions differing in the tilt angle and the alignment are formed in one pixel electrode region has been also proposed (see the Japanese Publications for Laid-Open Patent Applications No.5-210099/1993 (Tokukaihei 5-210099) and No.7-64096/1995 (Tokukaihei 7-64096)). With this arrangement, the viewing angle dependence can be suppressed to some extent.

Furthermore, a new-type LCD device which utilizes a so-called IPS (in-plane switching) scheme has been developed as an LCD device of a new arrangement, and mass-production of the same has been promoted (see Nikkei Microdevices, July 1997, pp.108–110). This is the display scheme which provides the most excellent viewing angle properties among various display schemes now being subject to practical application, and this is actually installed in monitors of computers and the like.

However, in the case of the aforementioned arrangement disclosed by Tokukaisho 58-172685 wherein $SiN_x$, $SiO_2$, $TaO_x$, or the like is deposited by the CVD method or the sputtering method so as to form a transparent insulating film which is served as the interlayer insulating film 68, as shown in FIG. 12, a surface of the interlayer insulating film 68 becomes uneven due to unevenness of the surfaces of the metal layers 67a and 67b, the channel protective layer 65, and the like thereunder. Therefore, in the case where the pixel electrodes 51 are formed on the interlayer insulating film 68, further greater level differences occur in accordance with level differences of various films underneath, whereby defects in liquid crystal molecule alignment (disclination) occur.

Furthermore, in the case where, to flatten a surface on which a pixel section is formed, an organic film is formed by applying polyimide or the like conventionally available in the market, a step for forming contact holes for electrically connecting the pixel electrodes 51 with the drain electrodes 66b has to be added to the manufacturing process. More concretely, a step of conducting photo-patterning with respect to the organic film made of polyimide or the like by using a mask, then, forming contact holes by etching, and finally, peeling off a photoresist which is no longer necessary has to be added.

Besides, if such organic film conventionally sold in the market is applied to the LCD device arranged as described above, the resin appears discolored after the interlayer insulating film 68 is formed.

For these reasons, such arrangement does not render the LCD device high translucency, transparency, and color reproductivity.

A photosensitive polyimide film may be used as the interlayer insulating film 68 to cut the etching and peeling step, but if a conventional material is used, it appears more discolored, resulting in further deterioration of the display quality. For this reason, this arrangement cannot be applied to an LCD device required of high translucency and transparency.

Furthermore, in the case where, as in the aforementioned arrangement, the pixel electrodes 51 are allowed to be laminated above the scanning lines 53 and the signal lines 54 by forming the interlayer insulating film 68 therebetween so that the aperture ratio of the LCD device is improved, electric capacity between the scanning lines 53 and the signal lines 54 on one hand and the pixel electrodes 51 on the other hand increases, thereby impairing the display quality.

More specifically, since an inorganic film such as an SiN film has a high dielectric constant such as 8 and such a film is formed by the CVD method or the like, it has to be formed thin to 500 nm or less with a view to reducing defects caused by film forming stress and film forming time (reflected in costs). For these reasons, the electric capacity between the scanning lines 53 and the signal lines 54 on one hand and the pixel electrodes 51 on the other hand drastically increases.

Therefore, the following problems (1) and (2) arise.

(1) In the case of an arrangement wherein the signal lines 54 and the pixel electrodes 51 are laminated, the signal transmittance (leakage of signals) increases due to an increase in the electric capacity between the signal lines 54 and the pixel electrodes 51. This causes the signal voltages held by the pixel electrodes 51 during a signal holding time to fluctuate depending on potentials of the data signals on the signal lines 54. This further causes effective values of the voltages (effective voltages) to alter upon application of voltages by the pixel electrodes 51 on the liquid crystal, thereby particularly causing vertical cross-talk to pixels neighboring in vertical directions in display actually obtained.

A driving method of an LCD device wherein each signal line 54 is supplied with a set of data signals corresponding to the signal line 54 with the polarity thereof alternately inverted has been proposed, for example, in the Japanese Publication for Laid-Open Patent Application No.6-230422/1994 (Tokukaihei 6-230422) so as to reduce the influence of electric capacity between the signal lines 54 and the pixel electrodes 51 onto the displayed images. This driving method is capable of rendering great effects to an LCD device wherein neighboring pixels have close correlation concerning display, as in a monochromatic LCD device.

However, in an LCD device wherein pixel electrodes are arranged in a vertical stripe form, as in a usual notebook-type personal computer, neighboring pixels connected with one signal line 54 have different colors to display. In the case of color display in particular, for example, in one pixel region shaped in a square, three pixel electrodes 51 corresponding to three colors of red (R), green (G), and blue (B) respectively are arranged in this order in a rectangular shape which is long in a vertical direction (this arrangement of the pixel electrodes 51 is hereinafter referred to as a vertical stripe arrangement).

In the case of a usual color display device having pixel electrodes arranged in such a vertical stripe form, a sufficient effect of suppressing vertical cross-talk cannot be achieved by the aforementioned driving method wherein the polarity is alternately inverted for each signal line 54.

(2) In the case where the scanning lines 53 and the pixel electrodes 51 are laminated, the electric capacity between the scanning lines 53 and the pixel electrodes 51 becomes greater. Therefore, a drawback in that a field-through of a write voltage applied to the pixel electrodes 51 becomes greater arises from a switching signal for controlling the TFTs 52.

Note that it is possible to suppress the increase in the electric capacity by forming the inorganic film to not less than 500 nm in film thickness. However, as the inorganic thin film is formed thicker, a time consumed for this step in the manufacturing process increases thereby raising the costs, while cracks tend to occur due to a film formation residual stress thereby causing an increase in defects and deterioration of reliability.

Besides, with the arrangement disclosed in Tokukaihei 5-313159, it is possible to suppress the viewing angle dependence of the display screen in a specific direction, but the arrangement is not sufficient to suppress the viewing angle dependence in all directions.

Furthermore, the arrangement disclosed by Tokukaihei 6-75116 is insufficient as well to solve the reversal, particularly, the reversal which occurs when viewed in the normal viewing angle direction. In the arrangement disclosed in Tokukaihei 6-75116, as described above, conditions of the phase difference plate are set so that the index ellipsoid is inclined. On the other hand, in an embodiment, used is an LCD element whose liquid-crystalline material has an refractive index anisotropy Δn of 0.08 and whose liquid crystal layer has a thickness d of 4.5 μm, i.e., whose liquid crystal layer has a retardation Δn·d of 360 nm. However, nothing more than the above is mentioned about what type of an LCD element and what type of a polarizing plate should be used so that the phase difference plate is provided therebetween.

As for the arrangement wherein the viewing angle dependence is suppressed by providing the phase difference plate between the LCD element and the polarizing plate, it is necessary to set properties of not only the phase difference plate but also the LCD element. Therefore, regarding this arrangement, in what range the value of Δn·d of the LCD element combined with the phase difference plate should be in order to most efficiently conduct compensation of the phase difference is unclear. As a result, there is a drawback in that the arrangement is still insufficient to suppress the viewing angle dependence of the LCD device with the use of the phase difference plate.

Furthermore, in an arrangement disclosed in the Japanese Publication for Laid-Open Patent Application No.8-50206/ 1996 (Tokukaihei 8-50206) which is improved as compared with Tokukaihei 5-313159, the viewing angle properties are considerably improved in all directions as compared with the conventional phase difference plate, whereas it is difficult to say that the problem of the gradation reversal which occurs when viewed in the normal viewing angle direction is sufficiently solved.

Moreover, with an arrangement disclosed in the Japanese Publication for Laid-Open Patent Application No.7-64096/ 1995 (Tokukaihei 7-64096), which features division alignment, the viewing angle properties are equalized upward and downward, thereby remarkably solving the reversal when viewed in the normal viewing angle direction.

On the other hand, there is still a drawback in that the viewing angle properties rightward and leftward and in the anti-viewing angle direction are not sufficiently improved.

Besides, the LCD device of the IPS type is superior to any one of the aforementioned arrangements in the viewing angle properties in all directions. However, a pixel aperture ratio of the pixel section is low because of the comb-like electrode structure and the like. Therefore, in the case where it is adapted to be used in a monitor or the like, the number of light sources has to be increased to double of the usual number so that necessary luminance is obtained, thereby causing a weight and a size (particularly, a structural thickness) thereof to increase while consuming more power. Therefore, it is particularly unfavorable to use it in a notebook-type personal computer. Moreover, such a high-end notebook-type personal computer or a work station necessitates a transverse luminance of 200 cd/m$^2$, and in order to obtain a traverse luminance comparable to that of a CRT display device, about 400 cd/m$^2$ is necessitated. And in the case where a liquid crystal panel with a low pixel aperture ratio is further used, the number of light sources for a backlight has to be increased. Therefore, sometimes the liquid crystal has a great temperature rise, thereby becoming unusable, or requiring an extra cooling unit.

SUMMARY OF THE INVENTION

The present invention is to solve the aforementioned problems of the conventional cases, and the first object of the present invention is to provide an LCD device wherein, by providing flat pixel electrodes and wires so as to overlap each other, (1) the aperture ratio is raised, (2) disclination of liquid crystal is suppressed, and (3) influences on the display of cross-talk and the like that tend to be caused by capacity components between the wires and the pixel electrodes are further reduced, so that excellent display is obtained. By thus arranging the LCD device, it comes to feature (i) suppression of the lowering of the contrast, the discoloring, and the reversal, which tend to occur depending on a viewing angle, (ii) high luminance, low power consumption, high precision, and high color reproductivity, and (iii) high-quality images with vivid colors, particularly white and red colors not inferior to those of the CRT display device, which are reproduced in a wide viewing angle range of not less than 70°.

To achieve the foregoing first object, a first LCD device of the present invention is characterized in comprising (1) an LCD element including at least a counter substrate, a pixel substrate, and a liquid crystal layer, wherein (i) the counter substrate has a common electrode, the pixel substrate or the counter substrate having a plurality of color filters, (ii) the pixel substrate has scanning lines, signal lines, switching elements each being provided in the vicinity of each point of intersection of the scanning lines and the signal lines, and pixel electrodes each being connected with each switching element, each switching element having a gate electrode connected with the scanning line, a source electrode connected with the signal line, and a drain electrode connected with the pixel electrode, each scanning line, signal line and switching element being covered with an interlayer insulating film being composed of an organic film whose optical transmittance is not less than about 95 percent with respect to light which is emitted from a light source and has a peak wavelength in the vicinity of a wavelength band of colors of the color filters, each pixel electrode being provided on each interlayer insulating film, and (iii) the liquid crystal layer is provided between the counter substrate and the pixel substrate, and is made of liquid crystal whose refractive index anisotropy Δn(450) with respect to light with a wavelength of 450 nm and whose refractive index anisotropy Δn(650) with respect to light with a wavelength of 650 nm satisfy a condition that a difference Δn(450)–Δn(650) between the refractive index anisotropies is in a range of 0 to 0.01. The LCD device further comprises (2) a pair of polarizers, each being provided on each side of the LCD element, and (3) at least one phase difference plate provided between the LCD element and the polarizers, three main refractive indexes na, nb, and nc of an index ellipsoid of the phase difference plate satisfying na=nc>nb at least in a representative layer of the same, either the main refractive index na or nc being parallel with a surface of the phase difference plate, the index ellipsoid being inclined, with a direction of the main refractive index nb being turned clockwise or anti-clockwise around the main refractive index na or nc direction parallel with the surface of the phase difference plate as an axis, so as to shift from a state where the index ellipsoid is parallel with a normal direction of the surface of the phase difference plate to an inclined state.

With the foregoing first arrangement, in the case where an interlayer insulating film is used so that the wires and pixel electrodes are laminated whereby the aperture ratio is raised, a portion on which a pixel is formed is made further flatter by making the interlayer insulating film of an organic material. By doing so, disclination of liquid crystal is suppressed. Furthermore, since the interlayer insulating film has a lower dielectric constant than that of a conventional inorganic thin film, the electric capacity between the wires and the pixel electrodes is decreased, whereby the signal transmission is suppressed as well. Therefore, influences on displayed images by the electric capacity between the wires and the pixel electrodes, such as cross-talk, can be decreased, while field-through of write voltages with respect to the pixel electrodes can be reduced as well. Besides, since it is possible to produce the aforementioned interlayer insulating film with a high transparency and high quality at a high productivity, the film can be formed thicker, thereby ensuring suppression of an increase in the electric capacity.

Furthermore, the interlayer insulating film is highly transparent, having an optical transmittance of 95 percent with respect to light which has a peak wavelength when the light from the light source passes through the color filter. Therefore, the light from the light source is utilized efficiently (that is, with low power consumption). As a result, even in the case where lower power is used thereby decreasing the light quantity of the light source, a bright display with high luminance can be obtained, and the LCD device has a better, bright display screen with vivid colors.

Here, optical elements such as the phase difference plates and the polarizing plates usually have a drawback in that the refractive index anisotropies thereof vary with wavelengths of light. For example, most of the phase difference plates used at present have a great refractive index anisotropy on a short-wave side and a small refractive index anisotropy on a long-wave side. However, by using liquid crystal whose refractive index anisotropies on the short-wave side and the long-wave side do not greatly differ from each other in combination with the above phase difference plate, a phase difference between ordinary light and extraordinary light which occurs depending on a viewing angle can be more efficiently compensated, as compared with the conventional cases.

Particularly, in the present invention, by using the aforementioned combination of the liquid crystal and the phase difference plate, conversion of elliptically polarized light into linearly polarized light is realized in a wide viewing angle range. More specifically, the discoloring and the reversal which tend to occur as the viewing angle changes are avoided in a viewing angle range up to about 70° as a threshold. Therefore, as compared with the conventional LCD devices, the viewing angle dependence is suppressed, and as a result the LCD device features in as excellent image quality as that of the CRT display device, particularly vivid white and red colors even when viewed at a greater viewing angle than 70°.

The first LCD device is preferably characterized in that (1) the pixel substrate further includes junction electrodes each of which connects each pixel electrode and each drain electrode, (2) each interlayer insulating film is formed so as to cover the switching element, the scanning line, the signal line, and the junction electrode, (3) the pixel electrode is provided on the interlayer insulating film so that the pixel electrode partly overlap at least either the scanning line or the signal line, and (4) each junction electrode is connected with each pixel electrode through a contact hole piercing the interlayer insulating film.

With this arrangement wherein the pixel electrode is connected with the drain electrode of the switching element through the junction electrode, the contact hole with a smooth and even side wall can be formed even in the case where the switching element is small in size. Besides, by burying a conductive material in the interlayer insulating film, the junction electrodes can be easily formed at a high yield, with less occurrence of the breaking of wire.

Furthermore, in the case where the junction electrode is formed as a transparent conductive film flatly over the pixel electrode with the interlayer insulating film provided therebetween, the pixel aperture ratio is further raised.

In addition, the first LCD device is preferably characterized in that (1) said pixel substrate further includes additional capacities for holding voltages applied to said liquid crystal layer, and (2) each contact hole is provided above an electrode connected with each additional capacity or each scanning line.

By thus providing the contact holes above light shield members such as wires having a light blocking property connected with the additional capacitors, or the scanning lines, the light leakage due to disclination of the liquid crystal can be prevented from reversely affecting, and therefore, the lowering of the contrast of the display screen does not occur. Moreover, since the contact holes can be provided on the same substrate, the accuracy in positioning of the light shield members and the contact holes is enhanced, thereby further raising the pixel aperture ratio. For this reason, the LCD device is made to have a bright display screen with lower power consumption.

Furthermore, the first LCD device is preferably characterized in that the liquid crystal is arranged so that a refractive index anisotropy $\Delta n(435)$ of the same with respect to light with a wavelength of 435 nm and a refractive index anisotropy $\Delta n(610)$ of the same with respect to light with a wavelength of 610 nm satisfy a condition that a difference $\Delta n(435)-\Delta n(610)$ between the refractive index anisotropies is not higher than 0.00875.

With this arrangement, the light transmitting properties of the liquid crystal layer and the color filters are well balanced, whereby light is efficiently utilized (power consumption is lowered) and the LCD device is made to have a bright display screen with improved display performance, particularly with less discoloring when viewed in an oblique direction.

Furthermore, the first LCD device is preferably characterized in that the color filters have an optical transmittance of not less than 85 percent with respect to at least a light with one peak wavelength among lights which enter through the pixel substrate.

By thus arranging the LCD device, the LCD device is made to have further efficiency in light utility (lower power consumption), and to exhibit further better display performance.

Furthermore, the first LCD device is preferably characterized in that the phase difference plate has a layer made of a compound having discotic structural units, inclination angles of disk planes of the discotic structural units with respect to the surface of the phase difference plate continuously or discontinuously varying in a depth direction of the phase difference plate.

With this arrangement, as compared with the conventional phase difference plates produced by the drawing method or the like, the phase difference plate is formed by the applying method easily at lower costs, with the quality less varying even in the case where the phase difference plate is formed large in size. Therefore, even an LCD device with a large-size display screen whose viewing angle dependence is conspicuous, particularly with a 20-inch to 40-inch display screen, can be made to exhibit high display performance.

Furthermore, herein, an inclination angle of an optical anisotropic axis of the phase difference plate is easily varied in a thickness direction of the phase difference plate by appropriately selecting an aligning operation with respect to a portion under the phase difference plate and a material of the portion. Therefore, to optimize combination of properties of the LCD element and the phase difference plate is easy. On top of that, it is easy to obtain an optimal structure of the phase difference plate in accordance with properties of an inner-side portion (a portion on a side to the liquid crystal layer) and an outer-side portion (a portion on a side to the atmosphere) of the LCD element, such as refractive indexes of the liquid crystal layer.

In addition, the first LCD device is preferably characterized in that an average of the inclination angles is 15° to 75°. With this, it is further ensured that the effects of the phase difference plate and the liquid crystal are exhibited, whereby the LCD device is made to exhibit higher display performance.

Furthermore, the first LCD device is preferably characterized in that liquid crystal of the liquid crystal layer is aligned so as to twist through an angle of 90°, and a display mode is a normally white mode.

With this arrangement wherein liquid crystal of said liquid crystal layer is aligned so as to twist through an angle of 90° and the normally white mode is applied, a display screen featuring improved display contrast and color reproductivity, and further suppression of the viewing angle dependence can be achieved. Particularly, in the normally white mode, because of the above arrangement, the display screen is made capable of displaying white color which is superior to white color in the normally black mode which is another display mode.

The present invention is to solve the aforementioned problems, and the second object of the present invention is to provide an LCD device wherein, by providing flat pixel electrodes and wires so as to overlap each other, (1) the aperture ratio is raised, (2) disclination of liquid crystal is suppressed, and (3) influences on the display by cross-talk and the like that tend to be caused by capacity components between wires and the pixel electrodes are further reduced, so that excellent display performance is achieved. By doing so, the LCD device is made to feature (i) suppression of the lowering of a contrast, the discoloring, and the reversal which tend to occur depending on a viewing angle, (ii) high luminance, low power consumption, high precision, and high color reproductivity, and (iii) display of high quality with vivid colors, particularly white and red colors in a wide viewing angle range up to at least 70° or above rightward, leftward, and in the anti-viewing angle direction, and up to about 40° in the normal viewing angle direction.

The present invention is particularly intended to provide an excellent LCD device which is not inferior to an LCD device of the IPS type in the viewing angle properties in any direction, which is light in weight, thin in thickness, and consumes less power, and which is applicable to a monitor, and a potable apparatus such as a notebook-type personal computer.

To achieve the second object of the present invention, a second LCD device of the present invention is characterized in comprising (1) a counter substrate on which counter electrodes are provided, (2) a pixel substrate having scanning lines, signal lines, switching elements each being provided in the vicinity of each point of intersection of the scanning lines and the signal lines, interlayer insulating films, and pixel electrodes each being connected with each switching element provided on each interlayer insulating film, (3) alignment films provided on a surface of the counter substrate and a surface of the pixel substrate, respectively, the surfaces facing each other, (4) a liquid crystal layer formed by sealing a plurality of liquid crystal molecules between the counter substrate and the pixel substrate, (5) polarizers provided on the counter substrate and the pixel substrate, respectively, (6) a light source, (7) a color filter layer provided either on the counter substrate or on the pixel substrate, and (8) one phase difference plate provided either between the counter substrate and the polarizer or between the pixel substrate and the polarizer, or two phase difference plates, one being provided between the counter substrate and the polarizer, and the other being provided between the pixel substrate and the polarizer, wherein (i) the interlayer insulating film is an organic film whose optical transmittance is not less than about 95 percent with respect to light which is emitted from the light source and has a wavelength in the vicinity of a peak wavelength of a wavelength band of the color filter layer, (ii) three main refractive indexes na, nb, and nc of an index ellipsoid of the phase difference plate satisfy na=nc>nb at least in a representative layer thereof, either the main refractive index na or nc is parallel with a surface of the phase difference plate, and the index ellipsoid is inclined, with a direction of the main refractive index nb being turned clockwise or anti-clockwise around the main refractive index direction na or nc parallel with the surface of the phase difference plate as an axis, so as to shift from a state where the index ellipsoid is parallel with a normal direction of the surface of the phase difference plate to an inclined state, and (iii) the alignment films are arranged so that the liquid crystal molecules in a pixel region are aligned so as to be in a plurality of different alignment states.

With the foregoing arrangement, when the signal lines and the pixel electrodes are flatly laminated with the interlayer insulating film provided therebetween so as to raise the aperture ratio, unevenness of a portion above which the pixel electrode is formed and a portion therearound, due to wires and the like formed there, is eliminated by forming the interlayer insulating film which is made of an organic material. By doing so, a surface of the alignment film to which the aligning operation is applied is formed even and the electric capacity is lowered, while conditions concerning electric lines of force are improved, whereby disclination of liquid crystal is suppressed.

Furthermore, since a material with a low dielectric constant is used for forming the interlayer insulating film thereby reducing the electric capacity between the wires and pixel electrodes, the leakage of signals is suppressed, and the cross-talk and the field-through of write voltages with respect to the pixel electrodes are suppressed, resulting in enhancement of display performance.

Additionally, as the interlayer insulating film, a high-quality film with high transparency is formed thick by not the CVD method but the coating method at a high productivity. By forming it thicker, the electric capacity can be decreased.

Furthermore, the interlayer insulating film has high transparency and transmits not less than 95 percent of a necessary light with a peak wavelength among lights which are emitted from the light source and enter the color filters. Therefore, efficient utility of light emitted from the light source is realized, and hence, even in the case where the quantity of light from the light source (the number of the light sources) is decreased so as to lower the power consumption, equally bright, or even brighter display with vivid colors can be achieved, with a transverse luminance of not less than 200 cd/m$^2$.

Furthermore, by combining (1) the alignment division scheme with which the visibility in the normal viewing angle direction is improved and (2) the scheme wherein a phase difference plate one of whose main refractive index axes is inclined is used to improve the visibility from right, left, and the anti-viewing angle direction, defects of the foregoing schemes are cancelled by each other. As a result, the viewing angle ranges in all directions are considerably equalized, and an LCD device wherein neither discoloring nor reversal occurs is realized.

The second LCD device is preferably characterized in that the pixel region has a first region in which better visibility is obtained from either a top side or a bottom side, and a second region in which better visibility is obtained from the other side, the first and second regions being regions in the different alignment states respectively, a ratio of the first region to the second region being set in a range of 6:4 to 19:1.

As the ratio of the alignment division regions thus varies, the gradation reversal when viewed in the normal viewing angle direction and the contrast exhibit conflicting changes, that is, as either the suppression of the gradation reversal or the improvement of the contrast is achieved, the other is failed. Therefore, by selectively combining the alignment division ratio and the aforementioned phase difference plate, viewing angle properties are balanced in suppressing the gradation reversal and improving the contrast, and as a result, a viewing angle as a threshold of not less than 20°, and at most 40° in the normal viewing angle direction is achieved.

To be more specific, in the case where the alignment division ratio is substantially 17:3, an adequate contrast and the suppression of reversal are equally achieved till the viewing direction inclined at an angle of 70° or over rightward, leftward, and in the anti-viewing angle direction, and at an angle of about 40° in the normal viewing angle direction. On the other hand, in the case where the ratio is 19:1, the reversal in the normal viewing angle direction is suppressed till a viewing angle exceeds about 37° or 38°, which is better than the case of the conventional optical compensating plate wherein the threshold is 35°, and the contrast is improved with a threshold viewing angle (not less than 60°) sufficiently greater than that of the same conventional case. Besides, in the case where the ratio is 6:4, the threshold for the contrast is at least 20°, and that for the suppression of gradation reversal is more than that (not less than 55°) when viewed in the normal viewing angle direction. Note that deterioration of the contrast is not so conspicuous, as compared with the gradation reversal.

Furthermore, the second LCD device is preferably characterized in that the phase difference plate is disposed so that in the largest region among regions differing in alignment in the pixel region, an inclining direction of the liquid crystal molecules in the vicinity of inner surfaces of the alignment films when a voltage is applied by the pixel electrode thereto is opposite to the inclining direction of the index ellipsoid.

With this arrangement, the optical properties of the liquid crystal molecules in the largest region and those of the phase difference plate are reversely set. Therefore, the liquid crystal molecules in the vicinity of a surface of the alignment film do not rise due to an influence of the alignment even upon voltage application, and this inclination of the liquid crystal molecules is reduced by the phase difference plate. With this, it is possible to obtain excellent display whose gradation reversal is suppressed and which does not become excessively black when the viewing direction is inclined to the normal viewing angle direction. Besides, even when the viewing direction is inclined in the anti-viewing angle direction, the lowering of contrast is suppressed and an excellent display screen which does not become excessively white is obtained. In addition, the gradation reversal when viewed from the left or right sides is also suppressed.

Furthermore, the second LCD device is preferably characterized in that a refractive index anisotropy $\Delta nl(450)$ of liquid-crystalline material of the liquid crystal layer with respect to light with a wavelength of 450 nm, a refractive index anisotropy $\Delta nl(550)$ of the same with respect to light with a wavelength of 550 nm, a refractive index anisotropy $\Delta nf(450)$ of the phase difference plate with respect to light with a wavelength of 450 nm, and a refractive index anisotropy $\Delta nf(550)$ of the same with respect to light with a wavelength of 550 nm are set so as to satisfy:

$$(\Delta nl(450)/\Delta nl(550)-1)/(\Delta nf(450)/\Delta nf(550)-1)<0.25$$

The TN-type liquid crystal now in common use has no problem in actual utilization, but it becomes slightly yellowish when viewed at a viewing angle of 70° from right or from left. On the other hand, it was confirmed about the second LCD device arranged as above that substantially no such discoloring was recognized even when viewed at a viewing angle of 70° from right or left.

Besides, it is preferable that wavelength variation of the liquid crystal per se is small and the wavelength variation of the phase difference plates is reverse to that of the liquid crystal. Further, it is more preferable that a value of the left side of the above formula is negative.

Besides, it is preferable that in the value of the left side of the above formula is less than 0.18, since in such a case no discoloring is recognized at all till the viewing angle rightward or leftward exceeds 70° as the threshold.

Furthermore, the second LCD device is preferably characterized in that a refractive index anisotropy $\Delta nl(650)$ of liquid-crystalline material of the liquid crystal layer with respect to light with a wavelength of 650 nm, a refractive index anisotropy $\Delta nl(550)$ of the same with respect to light with a wavelength of 550 nm, a refractive index anisotropy $\Delta nf(650)$ of the phase difference plate with respect to light with a wavelength of 650 nm, and a refractive index anisotropy $\Delta nf(550)$ of the same with respect to light with a wavelength of 550 nm are set so as to satisfy:

$$(\Delta nl(550)/\Delta nl(650)-1)/(\Delta nf(550)/\Delta nf(650)-1)<0.25$$

Regarding the foregoing arrangement, it was confirmed that substantially no discoloring was recognized when the viewing direction was inclined rightward or leftward at an angle of 70°.

It is preferable that wavelength variation of the liquid crystal per se is not great and the wavelength variation of the phase difference plates is reverse to that of the liquid crystal. Further, it is more preferable that a value of the left side of the above formula is negative.

Besides, it is preferable that in the value of the left side of the above formula is less than 0.18, since in such a case no discoloring is recognized at all till the viewing angle rightward or leftward exceeds 70° as the threshold.

The second LCD device is preferably characterized in that division borders for dividing regions differing in alignment are provided above the scanning lines, the signal lines, and wires which are made of the same material as that of the scanning lines and the signal lines and have light blocking properties.

According this arrangement, the alignment division borders always run on light shield members already formed. Therefore, the leakage of light due to disclination of liquid crystal in the vicinity of the alignment division borders is prevented without lowering the aperture ratio (a ratio of light transmitting areas in a pixel region), thereby resulting in improvement of display quality.

Furthermore, the second LCD device is preferably characterized in that each interlayer insulating film composed of an organic film is laminated over the scanning lines and signal lines with an inorganic insulating film therebetween, and is laminated directly on the pixel substrate.

According to the foregoing arrangement, the scanning lines and the signal lines are covered with the inorganic insulating film at an early stage before the formation of the organic film. Therefore, changes of properties such as oxidization of surfaces hardly occur to the scanning and signal lines, whereby the scanning and signal lines have high reliability. On the other hand, in the pixel electrodes, partial reflection of the light to pass therethrough due to a difference between the refractive indexes of the inorganic film and the organic film does not occur. Therefore, the optical transmittance is enhanced, and the luminance is enhanced as well. Measurement was conducted with respect to a standard sample, though not with respect to the LCD device itself, and the result showed that the optical transmittance was improved by about 3 percent. Thus, it was confirmed that this arrangement is effective for improving the optical transmittance.

For a fuller understanding of the nature and advantages of the invention, reference should be made to the ensuing detailed description taken in conjunction with the accompanying drawings.

BRIEF DESCRIPTION OF THE DRAWINGS

FIG. 1(a) is a exploded cross-sectional view illustrating a fragmentary arrangement of an LCD device in accordance with an embodiment of the present invention, while

FIG. 5 is a graph illustrating an optical transmittance of an interlayer insulating film used in the LCD device.

FIG. 6 is a cross-sectional view of a pixel substrate in the LCD device.

FIG. 8(a) is an exploded cross-sectional view illustrating a fragmentary arrangement of an LCD device in accordance with another embodiment of the present invention, while

FIG. 14 is a diagram illustrating viewing angle properties of a conventional LCD device equipped with an active matrix substrate.

FIG. 15 is a diagram illustrating viewing angle properties of another conventional LCD device equipped with an active matrix substrate.

DESCRIPTION OF THE PREFERRED EMBODIMENTS

[First Embodiment]

The following description will explain an embodiment of the present invention, while referring to FIGS. 1(a) through 7(b). It should be noted that the present invention is not limited to this embodiment.

Figure 1A:
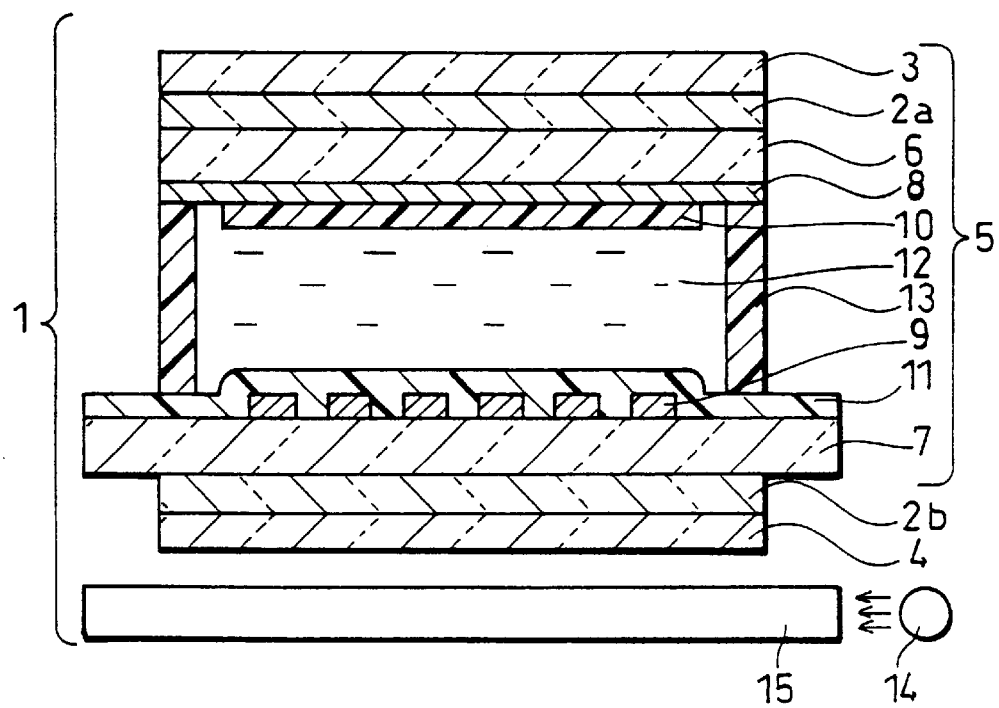

A liquid crystal display (LCD) device (first liquid crystal display device) 1 of the present invention has an LCD element 5, a phase difference plate 2a provided on one side of the LCD element 5, a phase difference plate 2b provided on the other side of the LCD element 5, and polarizing plates 3 and 4 as a pair of polarizers which sandwich the LCD element 5 and the phase difference plates 2a and 2b, as shown in FIG. 1(a).

The LCD element 5 is composed of a liquid crystal layer 12, a glass substrate 6 as a counter substrate, and a glass substrate 7 as a pixel substrate, the liquid crystal layer 12 being sealed between the glass substrates 6 and 7 with use of a sealing material 13. On a surface of the glass substrate 6, there are formed a transparent electrode layer 8 as common electrodes made of ITO (indium tin oxide), an alignment film 10 made of polyimide, polyvinyl alcohol, or the like, and a plurality of color filters (not shown) which are divided into groups and arranged so that each group corresponds to each pixel.

Likewise, a plurality of transparent electrode layers 9 as pixel electrodes made of ITO, and an alignment film 11 made of polyimide are formed on a surface of the glass substrate 7. The transparent electrode layers 9 are arranged so that several hundreds of the same are in one line and their positions correspond to positions of the color filters respectively.

Non-alkali glass is used to form the glass substrates 6 and 7. As liquid crystal used to form the liquid crystal layer 12, nematic liquid crystal is used in the present embodiment. To form the sealing member 13, thermosetting resin, ultraviolet-setting resin, or the like is used. Note that the aforementioned members are not limited to those mentioned herein.

In a backside part of the LCD device 1, that is, a side opposite to the side facing the transparent electrode layers 9, there are provided a light source 14 shaped in, for example, a long, slender cylindrical form and a light conductor 15 for conducting light emitted from the light source 14 toward the LCD element 5. The light source 14 and the light conductor 15 constitute a backlight unit. The backlight unit ensures that light from the light source 14 is evenly diffused and uniformly projected all over a region which corresponds to a display screen of the LCD device 1.

The drawing shows an arrangement wherein one light source 14 is provided on one side to the light conductor 15. However, to improve the luminance, any one of the following modifications may be applied: (1) a plurality of light sources may be provided on both sides of the light conductor 15; (2) direct light projection may be conducted by omitting the light conductor 15; and (3) a light source in an U-shape such that it substantially surrounds the light conductor 15 may be provided.

Figure 3:
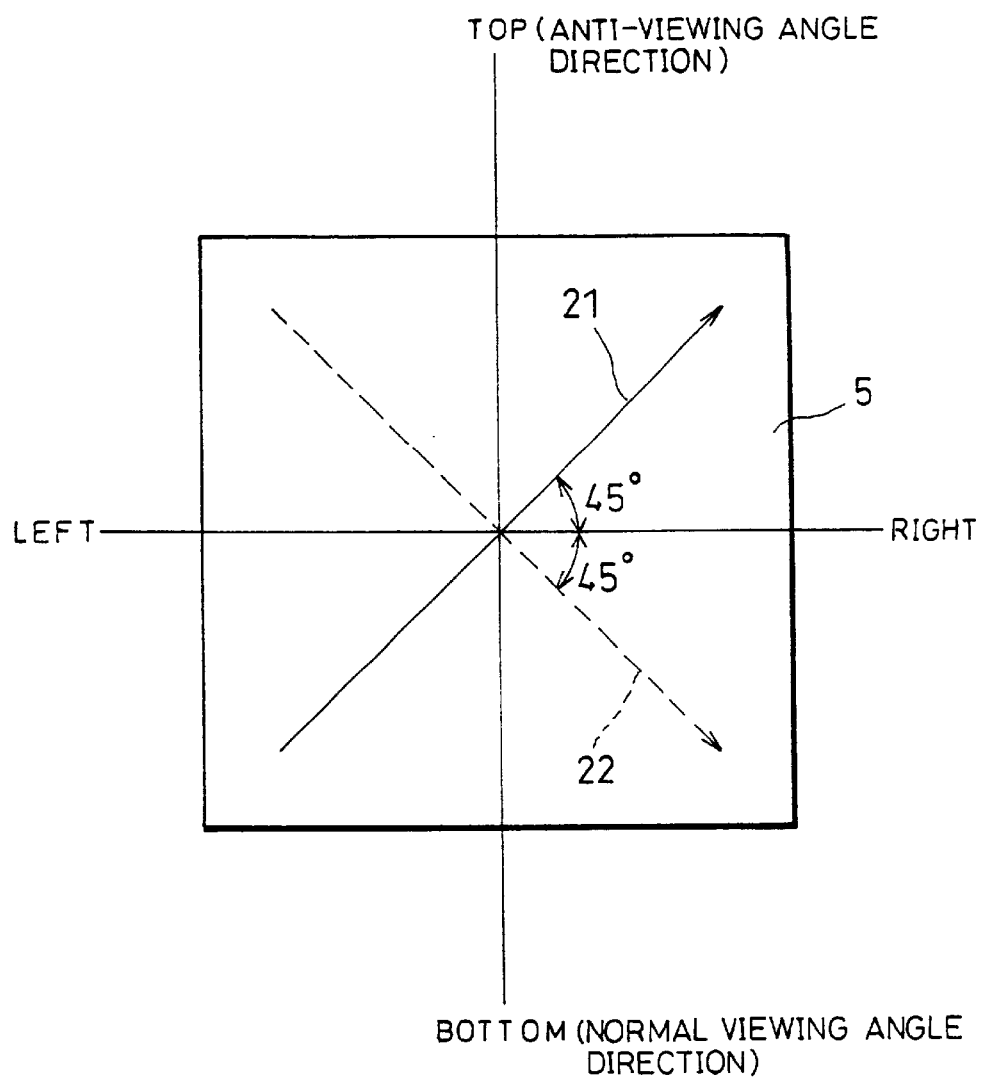
FIG. 3 is an explanatory view illustrating alignment relationship between a direction of a rubbing operation applied to an alignment film and the normal viewing angle direction.

Each surface of the alignment films 10 and 11 has already been subjected to a rubbing operation which would cause liquid crystal molecules therebetween are twist-aligned through an angle of about 90°. More specifically, as shown in FIG. 3, in the LCD element 5, a rubbing operation for alignment in a direction indicated by an arrow 21 is applied to the alignment film 10 on the glass substrate 6, while a rubbing operation for alignment in a direction indicated by an arrow 22 which is orthogonal to the arrow 21 is applied to the alignment film 11 on the glass substrate 7. Note that the direction of the arrow 21 and the direction of the arrow 22 are hereinafter referred to as a rubbing direction 21 and a rubbing direction 22, respectively.

Figure 4:
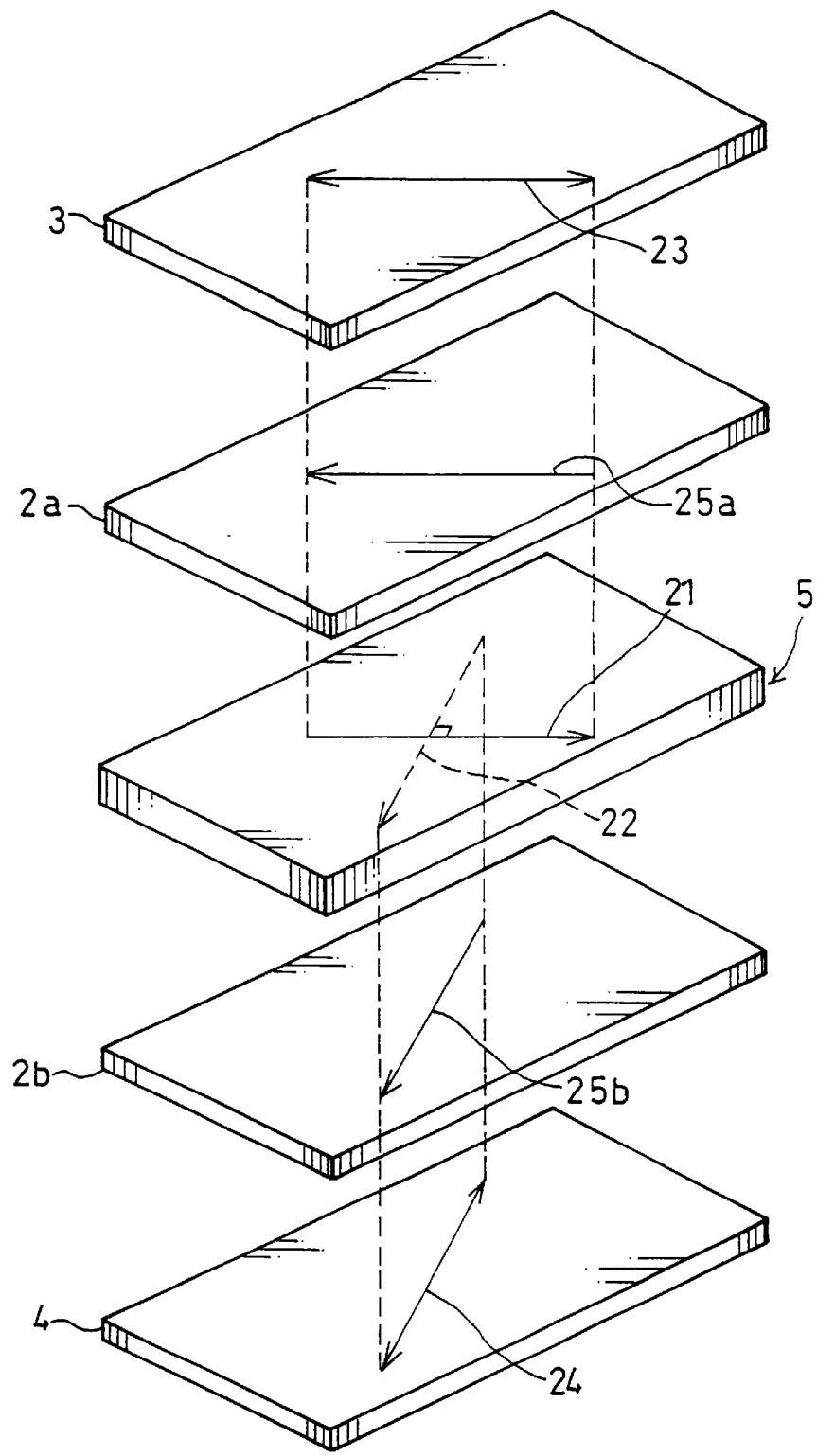
FIG. 4 is an exploded perspective view illustrating an optical arrangement of polarizing plates and phase difference plates in the LCD device.

In the LCD device 1 of the present invention, the polarizing plates 3 and 4 are arranged so that absorption axes 23 and 24 thereof orthogonally cross each other, as shown in FIG. 4. Therefore, in the case where no voltage is applied to the liquid crystal layer 12 of the LCD element 5, the LCD device 1 has a white display since the liquid crystal layer 12 transmits light. Namely, the display mode of the LCD device 1 is the normally white mode. Here, the absorption axis 23 of the polarizing plate 3 and the rubbing direction 21 of the alignment film 10 are set so as to be parallel with each other. The absorption axis 24 of the polarizing plate 4 and the rubbing direction 22 of the alignment film 11 are also set so as to be parallel with each other.

Here, regarding the main refractive index nb inclined in such a direction as renders anisotropy to the phase difference plates 2a and 2b, let directions resulting on projection of the direction of the main refractive index nb on the phase difference plate 2a and 2b be directions 25a and 25b, respectively. Herein, as shown in FIG. 4, the directions 25a and 25b are set so that the direction 25a of the phase difference plate 2a and the rubbing direction 21 are parallel and oppositely directed, while the direction 25b of the phase difference plate 2b and the rubbing direction 22 are parallel and directed in the same direction.

Note that regarding the phase difference plates 2a and 2b, compensation of phase differences is enabled by at least one phase difference plate between the polarizing plates 3 and 4. Alternatively, two or more phase difference plates 2a or 2b may be provided either between the polarizing plate 3 and the LCD element 5, or between the polarizing plate 4 and the LCD element 5. Besides, two or more phase difference plates 2a may be provided between the LCD element 5 and the polarizing plate 3 and two or more phase difference plates 2b may be provided between the LCD element 5 and the polarizing plate 4.

Figure 2:
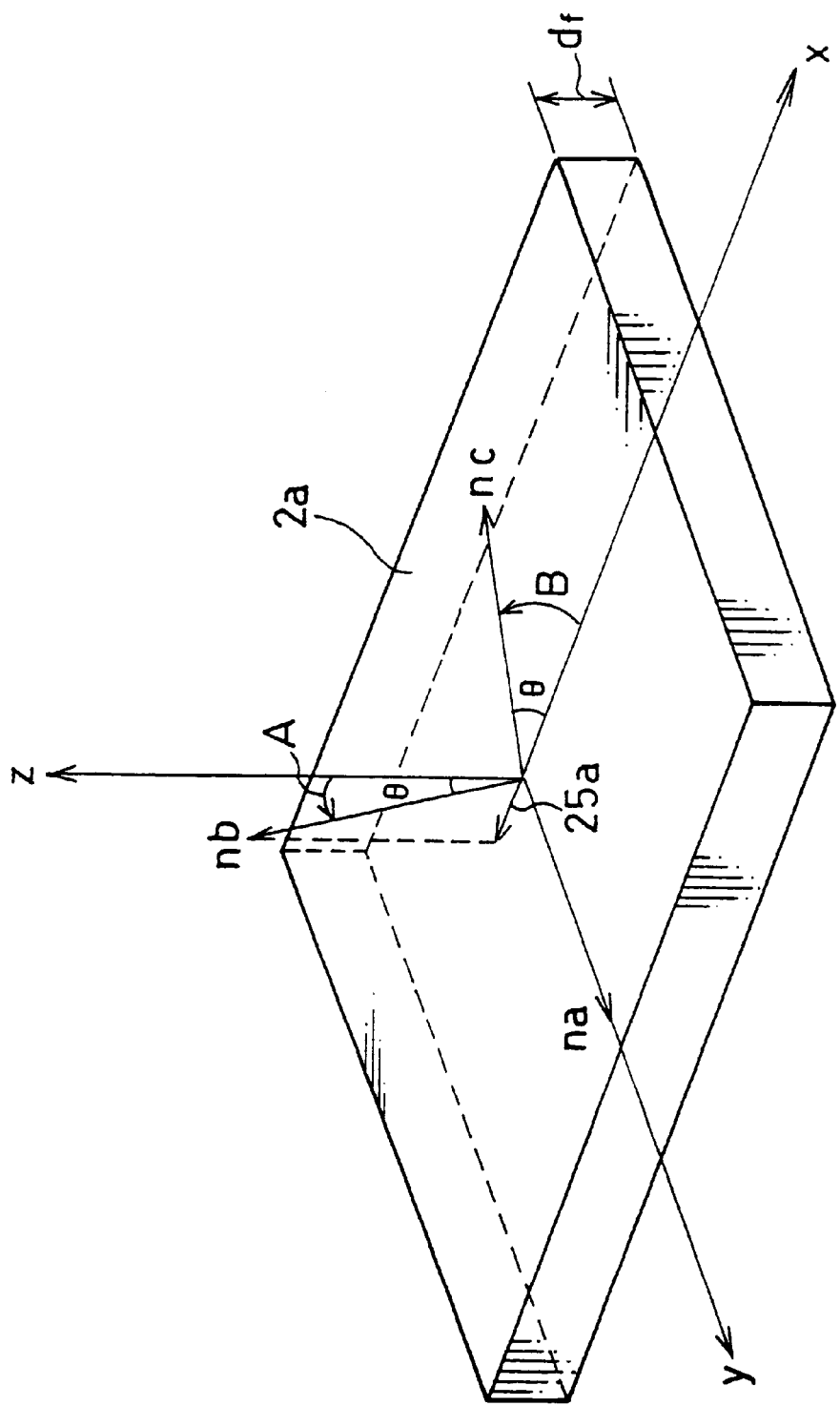
FIG. 2 is a perspective view illustrating main refractive indexes with respect to a phase difference plate of the LCD device.

The phase difference plate 2a used in the LCD device 1 is in a state such that, as shown in FIG. 2, at least in a representative layer, the three main refractive indexes na, nb, and nc of the index ellipsoid satisfy na=nc>nb in average, that is, the refractive index anisotropy is negative, substantially throughout the phase difference plate 2a. Thus, the phase difference plate 2a is uniaxial, having only one optical axis. Let a surface of the phase difference plate 2a be an x-y plane of a rectangular coordinate system xyz, the direction of the main refractive index nb is inclined at an angle θ in a direction indicated by an arrow A with respect to the z axis which is in a normal direction of the surface of the phase difference plate 2a. In addition, the main refractive index nc is also inclined at an angle θ in a direction indicated by an arrow B with respect to the x axis which is parallel with the surface of the phase difference plate 2a.

In other words, the phase difference plate 2a is, on the whole, in a state such that the index ellipsoid is revolved anti-clockwise through an angle θ around a direction of the main refractive index na as an axis. Such revolution of the index ellipsoid may be clockwise revolution around a direction of the main refractive index na as an axis. Note that since the phase difference plate 2b has the same structure, an explanation on the same is omitted here.

In the present embodiment, phase difference plates in each of which a direction of the main refractive index nb is inclined at the angle θ of 20° are used as the phase difference plates 2a and 2b. Herein, a direction of the main refractive index nc is likewise inclined at the angle θ of 20°. In other words, the index ellipsoid is revolved anti-clockwise through an angle of 20° around the direction of the main refractive index na as an axis.

By differently setting retardation values of the phase difference plates 2a and 2b, the compensation of phase differences is surely achieved. Regarding such retardation values, there are first and second retardation values. The first retardation value of the phase difference plates 2a and 2b is, on the whole, a product of (1) a difference (nc−na) between the main refractive index nc and the main refractive index na and (2) a thickness $d_f$ of the phase difference plate 2a or 2b, that is, (nc−na)$d_f$. On the other hand, the second retardation value is a product of (1) a difference (nc−nb) between the main refractive index nc and the main refractive index nb and (2) a thickness of the phase difference plate 2a or 2b, that is, (nc−nb)$d_f$.

In the present embodiment, used as the phase difference plates 2a and 2b each is a phase difference plate resulting on applying discotic liquid crystal over a transparent supporting body (made of, for example, triacetylcellulose (TAC)) and aligning the discotic liquid crystal with an inclination so that the first and second retardation values are 0 nm and 100 nm, respectively.

The discotic liquid crystal which is provided on the phase difference plates 2a and 2b and is aligned with an inclination constitutes a layer in which a discotic structure in a circular form in liquid crystal molecules constitutes a structural unit of the liquid crystal layer. An inclination angle between a circular plane of the unit of the discotic structure and surfaces of the phase difference plates 2a and 2b varies continuously or discontinuously in a depth direction of the phase difference plates 2a and 2b. Here, an average of the inclination angle is preferably 15° to 75°.

Since the above discotic liquid crystal layer is formed by applying, such phase difference plates 2a and 2b are easily produced at lower costs in comparison with the conventional manufacturing process wherein the discotic liquid crystal layer is formed by drawing.

Besides, the producing method of the above phase difference plates 2a and 2b is easy and costs lower, since control for uniform tension required in the conventional drawing method is not necessary. Therefore, it is possible to produce even large-scale products (for example, 20-inch or larger ones) more easily at higher quality than the conventional method.

Here, conventional LCD devices had a drawback in that as the display screen became larger, a difference between viewing angles with respect to left and right edges of the display screen increased. Particularly, as to a 20-inch or larger display screen, when an observer viewed the display screen at a position at a vertical distance of 50 cm from the display screen and at a viewing angle of 70° with respect to a center of the display screen, remarkable discoloring was observed in an edge part of the display screen on a side farther from the observer.

At a shorter vertical distance, the discoloring was observed at a smaller viewing angle than 70°. Besides, in the case of a conventional display device with a 15-inch screen as well, remarkable discoloring was observed when the screen was viewed at a vertical distance of 35 cm and in a direction inclined rightward or leftward at a viewing angle of around 70°.

However, the phase difference plates on which the discotic liquid crystal as described above is formed can be formed in a greater size, and on top of that, unevenness of quality or deterioration of quality which usually occurs when forming it large in size decreases. Therefore, higher-quality phase difference plates 2a and 2b than conventional ones can be obtained.

Therefore, with the arrangement of the present embodiment, it is possible to realize high-performance display even with an LCD device having a large-scale screen in which a viewing angle difference tends to be outstanding, such as (1) a personal-use LCD device with a 15-inch screen which is used at a shorter distance from a user, (2) an LCD device with a 20-inch or larger screen for use in various monitors, which is observed at greater distances at various viewing angles, and (3) a large-scale LCD device with a 20-inch to 40-inch screen for use in a monitor for domestic use, business use, or office automation use, which has recently been in high demand and developed.

Besides, the inclination angle of an optical anisotropic axis in the phase difference plates 2a and 2b is easily varied in a thickness direction of the phase difference plates 2a and 2b by appropriately selecting an alignment process for and a material of bases underneath. By doing so, in addition to the optical compensation with respect to the phase difference plates 2a and 2b for matching the same with the properties of the liquid crystal layer 12 of the LCD element 5, optimal optical correction is easily conducted in accordance with optical properties of constituent members of an inner part (on a side to the liquid crystal) and an outer part (on a side to the atmosphere) of the LCD element 5, for example, a refractive index of the liquid crystal layer 12. Therefore, the phase difference plates 2a and 2b can be easily made to have an optimal structure.

The phase difference plates 2a and 2b were applied to the LCD device 1, and the display screen of the LCD device 1 was viewed in directions inclined rightward, leftward, and upward at an angle of 50° each. Then, neither discoloring nor reversal was observed in any case, and fine display was realized.

The phase difference plates 2a and 2b were applied to the LCD device 1, and the display screen of the LCD device 1 was viewed in directions inclined rightward, leftward, and upward at an angle of 60° or a greater angle each. Then, neither discoloring nor reversal was observed in any case, and fine display was realized.

In another case, phase difference plates 2a and 2b formed by the following manner were likewise applied to the LCD device 1: discotic liquid crystal was repeatedly applied to each transparent supporting body, and hybrid alignment of discotic liquid crystal was achieved by changing a direction of inclination of a circular plane of discotic liquid crystal structure units to a thickness direction, so that a first retardation value was 0 nm while a second retardation value was 100 nm.

The screen of the foregoing LCD device 1 was viewed in directions inclined rightward, leftward, and upward at an angle of 50° to 70° each, and in these cases as well, neither discoloring nor reversal was observed and fine display was realized.

Further, the screen of the foregoing LCD device 1 was viewed in direction inclined rightward, leftward, and upward at an angle of over 70° each, neither discoloring nor reversal was observed, and fine display was realized.

Since a phase difference between ordinary light and extraordinary light which occurs depending on a viewing angle is compensated in a wide range so as to achieve high quality by using the above phase difference plates 2a and 2b, conversion to linearly polarized light is enabled through a wide range of viewing angles, thereby enabling elimination of the discoloring and the reversal which occur depending on the viewing angle. Thus, the LCD device 1 can be made to have less viewing angle dependence.

In the LCD device 1 of the present embodiment, it is preferable to use, in combination with the aforementioned phase difference plates 2a and 2b, liquid crystal arranged so that a difference between a refractive index anisotropy $\Delta n(450)$ with respect to light with a wavelength of 450 nm and a refractive index anisotropy $\Delta n(650)$ with respect to light with a wavelength of 650 nm, i.e., $\Delta n(450)-\Delta n(650)$, is in a range of 0 to 0.01 (hereinafter this condition is referred to as a condition(1)) as the liquid crystal layer 12, since by doing so the discoloring which occurs when viewed at a greater viewing angle is further reduced.

Furthermore, it is preferable to use liquid crystal which satisfies, in addition to the condition (1), another condition that a difference between a refractive index anisotropy $\Delta n(435)$ with respect to light with a wavelength of 435 nm and a refractive index anisotropy $\Delta n(610)$ with respect to light with a wavelength of 610 nm, i.e., $\Delta n(435)-\Delta n(610)$, is not more than 0.00875 (hereinafter this condition is referred to as a condition(2)) in addition to the above condition (1).

Optical elements such as the above phase difference plates 2a and 2b and the polarizers 3 and 4 usually differ in the refractive index anisotropy with respect to the light wavelength. For example, most of phase difference plates used as the phase difference plates 2a and 2b have a greater refractive index anisotropy with respect to a shorter wavelength while have a smaller refractive index anisotropy with respect to a longer wavelength. Therefore, by using liquid crystal which has a smaller difference between its refractive index anisotropies with respect to a shorter wavelength and that with respect to a longer wavelength in combination with the phase difference plates 2a and 2b, a phase difference between ordinary light and extraordinary light which occurs depending on a viewing angle is more effectively compensated than in conventional cases.

Note that a threshold value was found by experiments wherein disappearance of yellow coloring was checked by eye evaluation. Alternatively, by using liquid crystal having a refractive index small to some extent with respect to a shorter wavelength while having an absolutely great refractive index with respect to a longer wavelength, the viewing angle dependence is more effectively solved.

Particularly in the present invention, by using the aforementioned combination of the liquid crystal layer 12 and the phase difference plates 2a and 2b, the elliptically polarized light can be converted to the linearly polarized light even in the case where the observer views the display screen in a further inclined direction, i.e., at a greater viewing angle. Thus, the LCD device 1 is allowed to have display featuring less viewing angle dependence, with the discoloring and the reversal considerably solved.

In the present embodiment, the liquid crystal layer 12 was specifically formed by using three types of liquid-crystalline materials whose refractive index anisotropies $\Delta n(550)$ with respect to light with a wavelength of 550 nm was 0.07, 0.08, and 0.095, respectively, and a cell thickness of the LCD element (thickness of the liquid crystal layer 12) was set to about 5 $\mu$m. In any of these cases, excellent display was realized.

First of all, the liquid crystal layers 12 were formed by using the foregoing liquid-crystalline materials so as to satisfy the conditions (1) and (2), and each of liquid crystal layers 12 using the above liquid crystals and the phase difference plates 2a and 2b were combined. Eye evaluation was conducted with respect to them, and it was confirmed that the discoloring and the reversal in the LCD element 5 which usually occurs with the viewing angle change did not occur unless a viewing angle exceeded about 70° as a threshold. Thus, an LCD device which featured (i) less viewing angle dependence in comparison with the conventional LCD device, and (ii) image quality as excellent as that of the CRT display device, particularly, vivid white and red colors even when viewed at a greater viewing angle than about 70°, was obtained.

Then, a refractive index anisotropy $\Delta nl(450)$ with respect to light with a wavelength of 450 nm and a refractive index anisotropy $\Delta nl(550)$ with respect to light with a wavelength of 550 nm of the liquid-crystalline material of the liquid crystal layer, and a refractive index anisotropy $\Delta nf(450)$ with respect to light with a wavelength of 450 nm and a refractive index anisotropy $\Delta nf(550)$ with respect to light with a wavelength of 550 nm of the phase difference plates were set so as to satisfy the following relationship:

$$(\Delta nl(450)/\Delta nl(550)-1)/(\Delta nf(450)/\Delta nf(550)-1)<0.25$$

As a result, substantially no discoloring was observed as long as the viewing angle was not greater than 70° leftward or rightward.

Note that it is preferable that wavelength variation of the liquid crystal per se is not great and the wavelength variation of the phase difference plates is reverse to that of the liquid crystal. Further, it is more preferable that a value of the left side of the above formula is negative. Besides, it is preferable that the value of the left side of the above formula is less than 0.18, since in such a case no discoloring was observed at all.

Furthermore, a refractive index anisotropy $\Delta nl(550)$ with respect to light with a wavelength of 550 nm and a refractive index anisotropy $\Delta nl(650)$ with respect to light with a wavelength of 650 nm of the liquid-crystalline material of the liquid crystal layer, and a refractive index anisotropy $\Delta nf(550)$ with respect to light with a wavelength of 550 nm and a refractive index anisotropy $\Delta nf(650)$ with respect to light with a wavelength of 650 nm of the phase difference plates were set so as to satisfy the following relationship:

$$(\Delta nl(550)/\Delta nl(650)-1)/(\Delta nf(550)/\Delta nf(650)-1)<0.25$$

As a result, substantially no discoloring was observed as long as the viewing angle was not greater than 70° leftward or rightward.

Note that it is preferable that the value of the left side of the above formula is less than 0.18, since in such a case no discoloring was observed at all.

In the arrangement shown in FIG. 4, the liquid crystal layer 12 is aligned with the liquid crystal twisted through an angle of 90°. Besides, since the normally white mode is applied, it is possible to further enhance the display contrast and the color reproductivity, and suppress the viewing angle dependence. Particularly, the normally white mode is preferable to the normally black mode since the white color is displayed more vividly by the normally white mode.

The following description will explain a structure of the pixel substrate used in the LCD device 1 of the present invention.

On the glass substrate 7 used as a pixel substrate in the LCD element 5 of the present invention, as FIG. 6 shows a portion thereof, there are provided a plurality of TFTs 31 as switching elements, and there are further provided thereon a plurality of transparent electrode layers (pixel electrodes) 9. Note that FIG. 6 shows only one TFT 31, and further shows, as the pixel electrodes 9, a pixel electrode 9a which is connected with the TFT 31 shown, and a pixel electrode 9b next to the pixel electrode 9a.

The TFT 31 which controls the pixel electrode 9a is composed of a semiconductor thin film 34, a source electrode 35 formed on a source section of the semiconductor thin film 34, and a drain electrode 36 formed on a drain section of the semiconductor thin film 34. The semiconductor thin film 34 is formed above a gate electrode 32 provided on the glass substrate 7, with a gate insulating film 33 interlaminated between the semiconductor thin film 34 and the gate electrode 32 so as to cover the gate electrode 32.

The source electrode 35 of the TFT 31 is connected with a signal line 37a, and the drain electrode 36 is connected with a junction electrode 38 through which the drain electrode 36 is connected with the pixel electrode 9a. An interlayer insulating film 40 is formed so as to cover the TFT 31, the signal line 37a, and the junction electrode 38. The junction electrode 38 is connected with the pixel electrode 9a through a contact hole 39.

To form the interlayer insulating film 40, a resin such as an photosensitive acrylic resin, benzocyclobutene, or non-colored, transparent photosensitive polyimide is used. These photosensitive resins have high transparency, and are superior in translucency. In the present embodiment, the interlayer insulating film 40 is formed by using a mixture of (1) a positive-type photosensitive acrylic resin as a base polymer which is composed of a copolymer of methacrylic acid and glycidyl methacrylate and (2) a naphthoquinoneazide positive-type photosensitive material.

As indicated by a curve 40a of the graph shown in FIG. 5, the interlayer insulating film 40 made of the aforementioned material before exposure exhibits light absorption with respect to light whose wavelength is in a low wavelength range of 380 nm to 540 nm, due to the non-reacted photosensitive material which causes the discoloring. On the other hand, after exposing the interlayer insulating film 40, as indicated by a curve 40b of the graph shown in FIG. 5, the absorption property due to the discoloring, which is indicated by the curve 40a, has been eliminated by projecting ultraviolet rays, for example, i rays (365 nm), and an optical transmittance with respect to light with a peak wavelength in the light emitted from the light source 14 becomes substantially not less than 95 percent. Thus, the interlayer insulating film 40 with a further improved optical transmittance is obtained. For example, in the present embodiment, a peak wavelength of a spectrum of blue light in the light emitted from the light source 14 is 435 nm, and an optical transmittance of the interlayer insulating film 40 with respect to this light is substantially 95 percent. Further higher optical transmittances are obtained with respect to peak wavelength of spectra of green and red lights.

Therefore, the light from the light source 14 can be utilized efficiently (that is, with low power consumption). As a result, even in the case where the light quantity of the light source 14 is slightly decreased so as to lower the power consumption, bright display with a high luminance can be obtained, and the LCD device 1 can be made capable of providing more excellent display images with bright and vivid colors.

Figure 1B:
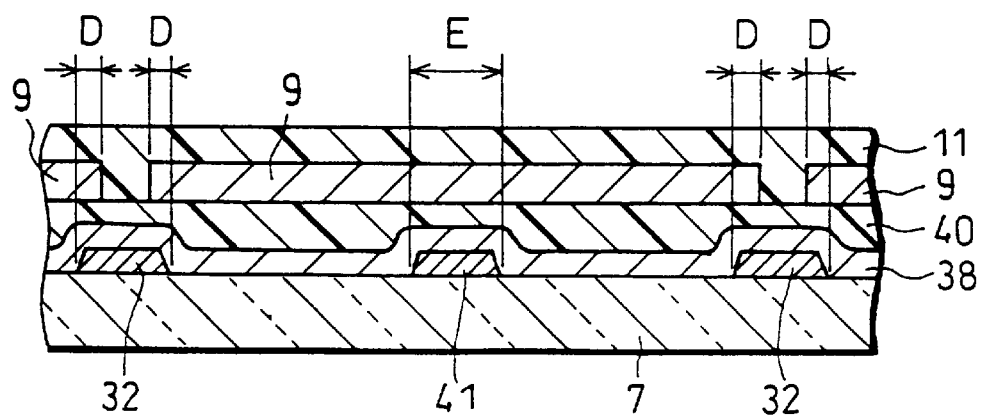
FIG. 1(b) is an explanatory view illustrating an arrangement of a pixel substrate of the LCD device shown in FIG. 1(a).

Additionally, as shown in FIG. 6, a part of the pixel electrode 9a is laminated on the signal line 37b which is connected with a TFT 31 (not shown) for driving a pixel electrode 9 (not shown) next to the pixel electrode 9a (see a lamination part C in FIG. 6). Besides, on the signal line 37a for supplying image signals to the pixel electrode 9a, a part of the pixel electrode 9b next to the pixel electrode 9a is laminated (see a lamination part C' in FIG. 6). Furthermore, let a plane section including the gate electrode 32, an additional capacitor 41, and the like be a lower layer electrode section while let a plane section including the pixel electrode 9 be an upper layer electrode section, then, as shown in FIG. 1(b), the interlayer insulating film 40 allows the upper and lower layer electrode sections to partially overlap each other. In FIG. 1(b), an overlapping part wherein the gate electrode 32 and the pixel electrode 9 overlap each other is indicated by D, while an overlapping part wherein the additional capacitor 41 and the pixel electrode 9 overlap each other is indicated by E.

Thus, the gate lines 32a and the signal lines 37b are made of a light shield metal material, thereby allowing translucent regions serving as pixels to be formed with small spacings between the gate lines 32a and the signal lines 37b. As a result, the pixel aperture ratio is improved, thereby improving the light utility efficiency.

In the case where liquid crystal alignment defect regions around the pixel electrodes 9a is shielded from light by separately providing light shield members on the glass substrate 7 or the opposite glass substrate 6, costs rise due to the material costs, and on top of that, extra spaces for margins in accordance with precision in formation of the light shield members and precision in assembling of the substrates 6 and 7 are needed as light shield regions, thereby lowering the aperture ratio.

Otherwise, light leakage due to such alignment defects which are caused by influences of electric fields of the gate lines 32a and the signal lines 37b around the pixel electrodes 9a reversely affects particularly when a viewing direction is inclined, thereby becoming a factor lowering the contrast. On the other hand, in the case where the light shield members are wide, reflection of light by surfaces of the light shield members accordingly increases, thereby lowering the contrast as well.

Unlike the conventional inorganic film, the interlayer insulating film 40 is formed so as to have a flat surface, so that the surface on which the pixel electrodes 9a and the alignment film 11 constituting the pixel section are laminated is flat. Therefore, the upper surface of the alignment film 11 is uniformly processed in the alignment process such as a rubbing process, thereby enhancing the quality, and also increasing the aperture ratio since the translucent regions serving as pixels are formed with small spacings between the gate lines 32a and the signal lines 37b. Thus, light shielding in high precision is realized by the gate lines 32a and the signal lines 37a with respect to the regions causing light leakage, and since such shielding members have a small width, unnecessary reflection light from the surfaces of the light shield members is less, thereby enhancing the contrast of the display.

Besides, since the interlayer insulating film 40 has a more flat surface on which the pixel sections are formed, compared with the case where an inorganic thin film is formed, disclination of the liquid crystal are eliminated and the tilt of liquid crystal molecules is more uniformly controlled to enable multi-gradation display. As a result, the display appeals more to the color sense of the observer.

Furthermore, since the interlayer insulating film 40 has a lower dielectric constant than that of the conventional inorganic thin film, each electric capacity between the signal line 37 and the gate line 32a on one hand and the pixel electrode 9 on the other hand is decreased, thereby suppressing an influence of each electric field. Therefore, the signal transmittance is also suppressed. For this reason, influences of cross-talk and the like which the electric capacity brings about to the display screen are reduced, while the field-through of write voltages to the pixel electrodes 9 are reduced.

In addition, since the interlayer insulating film 40 can be formed thick with high quality and excellent transparency at high productivity, it is possible to further suppress increase in the electric capacity by forming the same thick.

Note that in FIG. 6, the drain electrode 36 and the pixel electrode 9a are connected with each other in the vicinity of the TFT 31, but the junction electrode 38 may be extended to above the gate electrode 32 and the additional capacitor 41 (not shown in FIG. 6) adjacent to the junction electrode 38, whereby an extension section is formed. Besides, the junction electrode 38 may be connected with the pixel electrode 9a by forming a contact hole at an end of the extension section. The junction electrode 38 may be made of the same material as that of the drain electrode 36, or it may be made of a different material. The material of the junction electrode 38 is easily selected, by taking into consideration such conditions as the structure of the glass substrate 7, the manufacturing process, the manufacturing line, and the like.

With the foregoing arrangement wherein the junction electrode 38 is extended, a contact hole 39 with a smooth and even side wall can be formed, by providing the contact hole 39 above the additional capacitor electrode 41 or another portion made of a light shielding material even in the case where the TFT 31 is small in size. As a result, occurrence of the breaking of wire is reduced.

Furthermore, by burying a conductive material in the contact hole 39, to connect the junction electrode 38 or the drain electrode 36 with the pixel electrode 9a easily at a high yield is enabled, while a surface on which the pixel electrode 9a is formed is made flatter. Furthermore, occurrence of the breaking of wire is reduced.

Furthermore, though not shown in Figures, the junction electrode 38 may be formed as a transparent conductive film flatly over the pixel electrode 9 with the interlayer insulating film 40 provided therebetween, in the case where as described above the junction electrode 38 is extended. By forming the junction electrode 38 in this manner, the pixel aperture ratio is further raised.

As shown in FIG. 6, the contact hole 39 may be formed above the junction electrode 38 having a property of shielding light, or above a wire having a property of shielding light, which is connected with an additional capacitor (not shown). By thus providing the contact hole 39 above a light shield member such as a wire having a light shielding property or the junction electrode 38, light leaking from disclination portions of the liquid crystal can be blocked. For this reason, the display obtained does not suffer from lowering of contrast. Besides, the contact hole 39 can be formed on the glass substrate 7 on which the light shield member is formed, so as to be positioned right above the light shield member with high precision. Therefore, there is no longer need to expand the light shielding member, whereby the pixel aperture ratio is further raised.

Figure 7A:
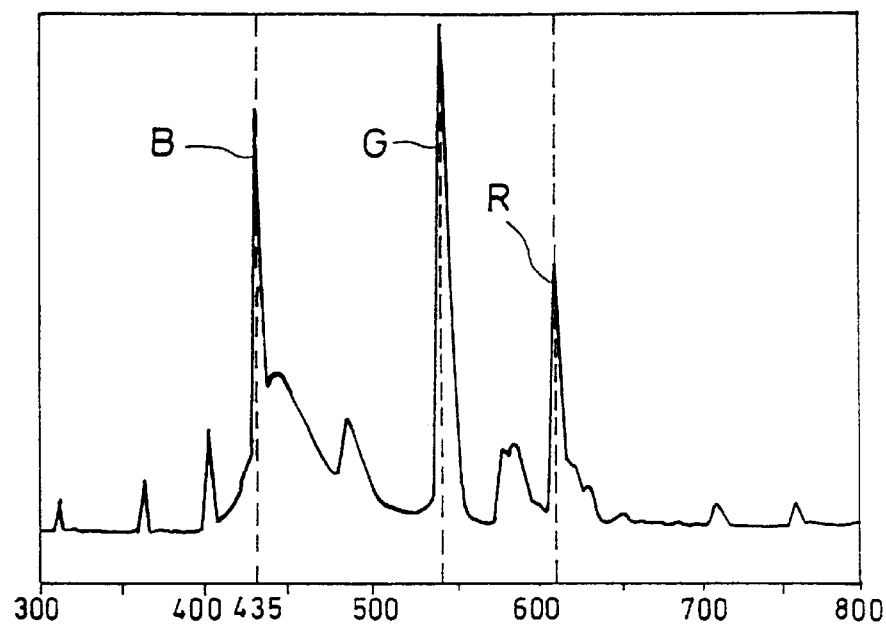
FIG. 7(a) is a graph illustrating a spectral distribution of light emitted from a light source used in the LCD device.

Furthermore, as shown in FIG. 7(a), the light source 14 used in the present embodiment emits light of which spectrum having a peak corresponding to each of the three colors, blue (B), green (G), and red (R). The light from the light source 14 passes through color filters after passing through the interlayer insulating film 40 described above (for example, immediately after passing through the interlayer insulating film 40 and reaching a plurality of the pixel electrodes 9), or before passing through the interlayer insulating film 40. The color filters used in the present embodiment are arranged, as shown in FIG. 7(b), so as to transmit light having spectra shown in FIG. 7(a) with a higher optical transmittance than that of the conventional color filters.

Figure 7B:
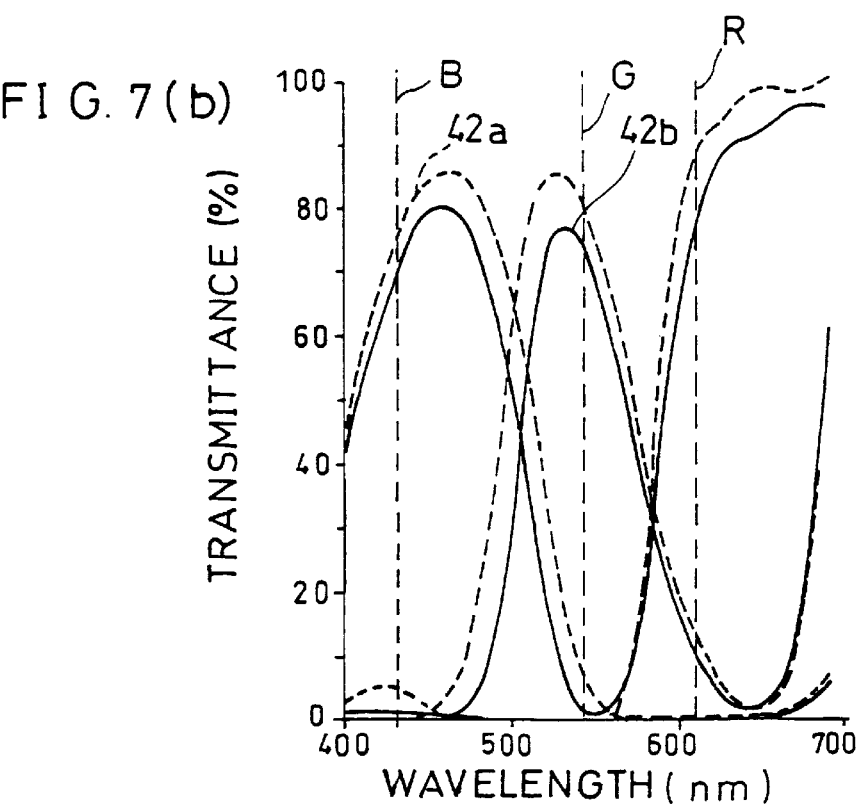
FIG. 7(b) is a graph illustrating transmission properties of color filters of two types used in the LCD device.

More specifically, a solid line in the graph of FIG. 7(b) indicates an optical transmittance of a conventional color filter 42b, while a broken line in the graph indicates an optical transmittance of a high-transmittance color filter 42a used in the present embodiment. The high-transmittance color filter 42a exhibits a higher optical transmittance on the whole, compared with the conventional color filter 42b, and exhibits particularly high optical transmittance of not less than 85 percent at a peak of the red light. On top of that, since the interlayer insulating film 40 has also a high optical transmittance as described above, vivid red can be displayed, while light from the light source 14 is efficiently utilized. Therefore, bright display with a further high luminance can be obtained, and the LCD device 1 can be made capable of providing more excellent displayed images with bright and vivid colors.

As has been described, a first LCD device of the present invention, having the aforementioned members, is arranged so that the viewing angle dependence is suppressed and that it is capable of further suppressing reverse influences on the display which are inherent in the structure of the pixel substrate. Besides, it is capable of conducting high-performance display with bright and vivid colors with low power consumption.

Therefore, since the LCD device of the present invention is capable of conducting as excellent display as that of the CRT display device, it is suitably applicable to a wide range of fields, for example, as a display device for use in a word processor, a computer, or a navigation system.

[Second Embodiment]

Figure 8A:
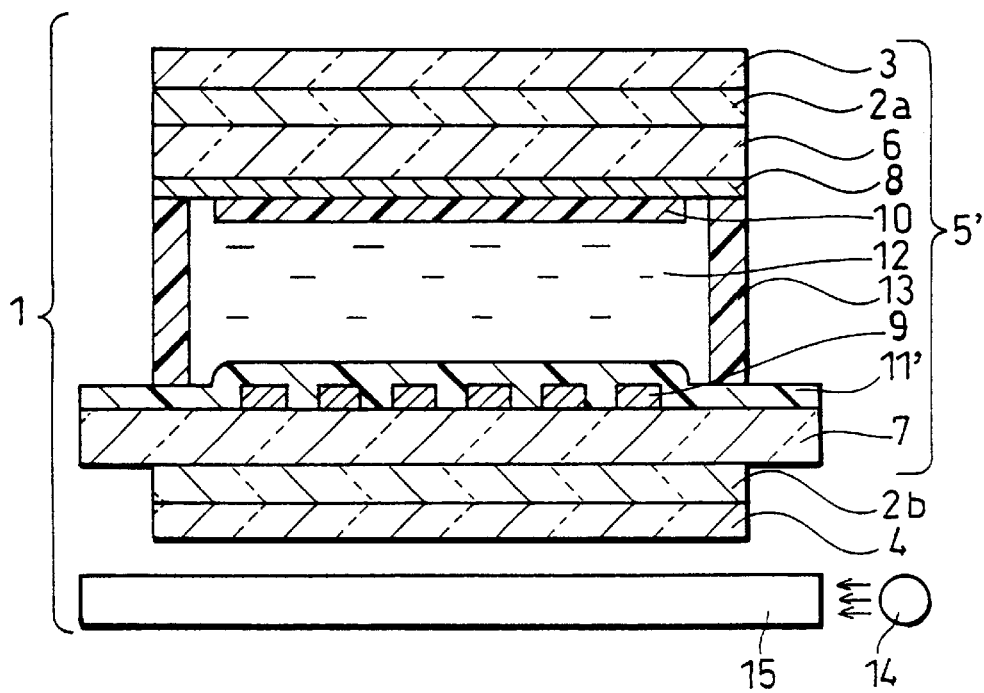
Figure 8B:
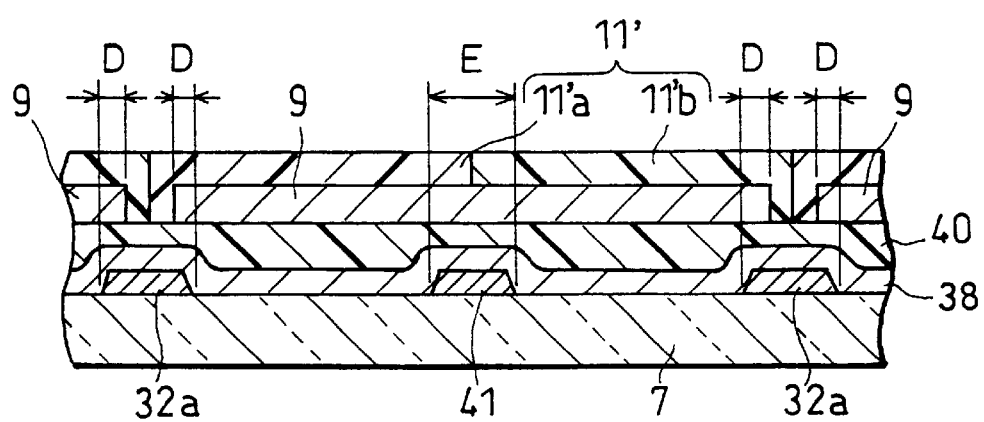
FIG. 8(b) is a cross-sectional view illustrating an arrangement of a substrate of the LCD device shown in FIG. 8(a).

The following description will explain another embodiment of the present invention, while referring to FIGS. 8(a) and 8(b). The members having the same structure (function) as those in the above-mentioned embodiment will be designated by the same reference numerals and their description will be omitted.

An LCD device 1' (second LCD device) in accordance with the present embodiment is equipped with an LCD element 5' in lieu of the LCD element 5 of the LCD device 1 in the first embodiment. The LCD element 5' has a plurality of alignment films which cause liquid crystal molecules to have different pre-tilt angles, or an alignment film 11' shown in FIGS. 8(a) and (b) which is composed of alignment films 11'a and 11'b differing in the alignment direction.

The pre-tilt angle cannot be detected as to an actual LCD device. An aligning operation was applied to the alignment films 11'a and 11'b under optimal conditions found by experiments on standard samples, so that the alignment films 11'a and 11'b would cause pre-tilt angles of about 2° and about 5°, respectively. The liquid crystal on a side to the counter substrate was not aligned in the foregoing manner, but was aligned under conditions under which a pre-tilt angle of about 3° was actually obtained with respect to a standard sample. By doing so, visibility is improved in all directions, which is impossible with only the phase difference plates 2a and 2b.

Various method for forming domains differing in alignment have been proposed and developed, but herein, a method wherein light (ultraviolet) was projected to only one domain (here, a domain causing a smaller pre-tilt angle, with the other region shielded with a master pattern) during the alignment operation was applied so that different pre-tilt angles were obtained.

There is a method wherein an alignment operation such as rubbing is conducted twice with different alignment directions, but this method requires more steps, for example, steps for processing the pixel substrate 7 and the counter substrate, respectively, and precision is impaired. Besides, in this case, defects may increase due to the breaking of switching elements caused by contamination of resist or static electricity generated upon rubbing operations.

However, by the aforementioned light-alignment division method, it is possible to produce the LCD device 1' so as to be superior in productivity, precision and quality.

Moreover, as shown in FIG. 8(b), by setting an alignment division border in the region of the gate line 32a or the additional capacitor 41, or the signal line 37 not shown, a dimensional error caused in the forming process is absorbed whereby to divide the translucent region at an accurate ratio is made possible, and light is blocked so as not to enter alignment defective regions along the alignment division border, whereby light leakage is prevented.

Though the alignment division ratio in FIG. 8(b) is substantially 1:1, but by differently adjusting the alignment division ratio, it is possible to improve the visibility in any direction arbitrarily at a good balance in accordance with a product utility purpose.

When the ratio of the alignment division regions is changed, conflicting changes of properties between (1) suppression of gradation reversal in the direction or (2) improvement of a contrast are exhibited: as either of them is improved, the other is impaired. In the case where the ratio of alignment domains of liquid crystal in one pixel is set in a range of 6:4 to 19:1, the viewing angle properties regarding the suppression of gradation reversal and the improvement of the contrast are balanced, while a threshold viewing angle of not less than 20° and at most 40° in the normal viewing angle direction is achieved.

Besides, the following was confirmed: by setting the alignment division ratio to substantially 17:3, viewing angle dependence properties in the case where the viewing direction is inclined rightward, leftward, and upward were substantially equalized, and the suppression of the gradation reversal which occurred and the improvement of a contrast were balanced when viewed from the bottom side (so that both the downward threshold viewing angles were 40°), whereby a product with unprecedented excellent comprehensive performances as an OA monitor was obtained.

Furthermore, the phase difference plates are disposed so that in the largest alignment domain in one pixel, an inclining direction of liquid crystal molecules in the vicinity of an inner surface of the alignment film when a voltage is applied by the pixel electrode thereto is opposite to an inclining direction of the index ellipsoid.

Therefore, the liquid crystal molecules in the vicinity of the alignment film do not rise upon voltage application, since being influenced by the alignment, but inclination of the liquid crystal molecules can be compensated by the phase difference plates. By doing so, it is possible to obtain excellent display whose gradation reversal is suppressed and which does not become excessively black when the viewing direction is inclined to the normal viewing angle direction.

Furthermore, the lowering of contrast is suppressed even when the viewing direction is inclined in the anti-viewing angle direction, and an excellent display screen which does not become excessively white is obtained. In addition, the gradation reversal which occurs when viewed in a viewing angle inclined to the left and right side is also suppressed.

[Third Embodiment]

Figure 9:
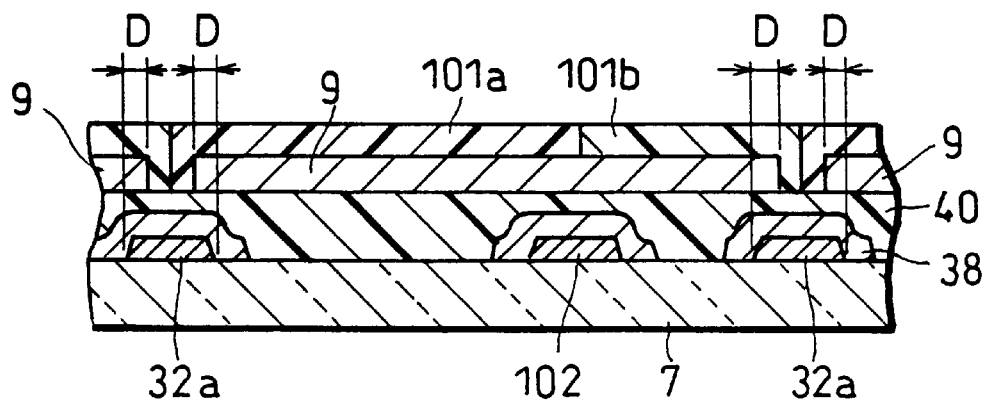
FIG. 9 is a cross-sectional view illustrating an arrangement of a pixel substrate in an LCD device in accordance with still another embodiment of the present invention.
Figure 10:
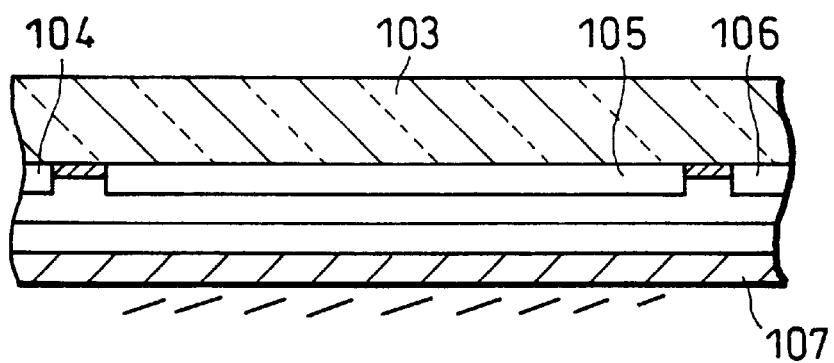
FIGS. 10(a) and 10(b) are cross-sectional views illustrating parts of an LCD device in accordance with still another embodiment of the present invention.
Figure 10:
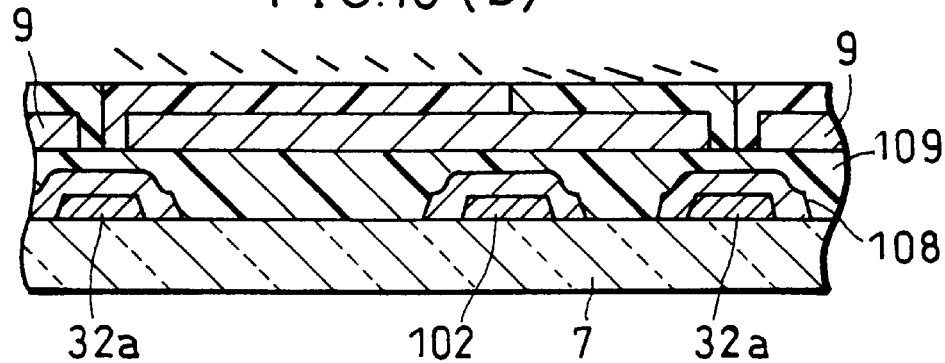
Figure 11:
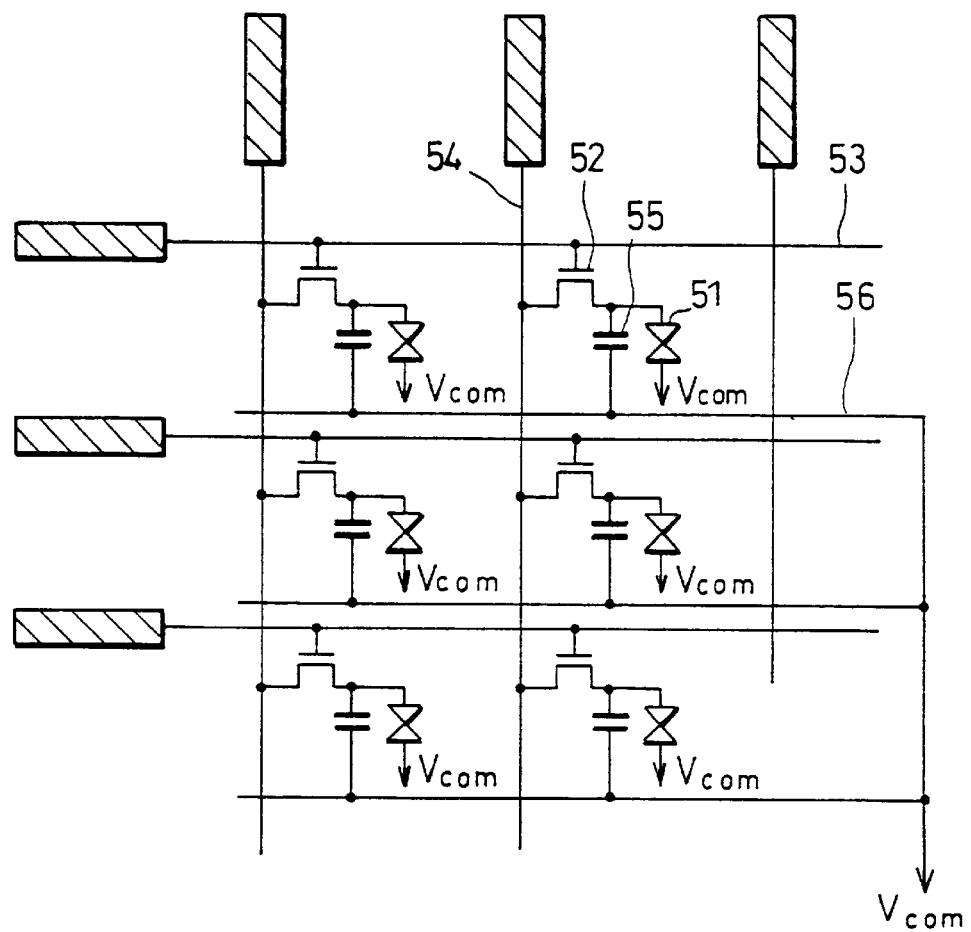
FIG. 11 is a circuit diagram illustrating an arrangement of a conventional transmission-type LCD device equipped with an active matrix substrate.
Figure 12:
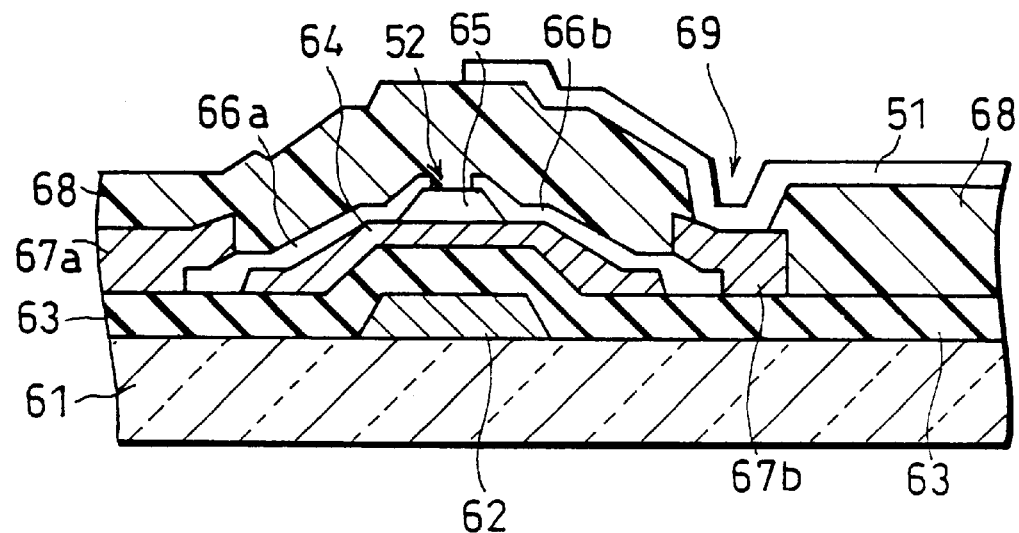
FIG. 12 is a cross-sectional view illustrating a TFT section of the active matrix substrate of the conventional LCD device.
Figure 13:
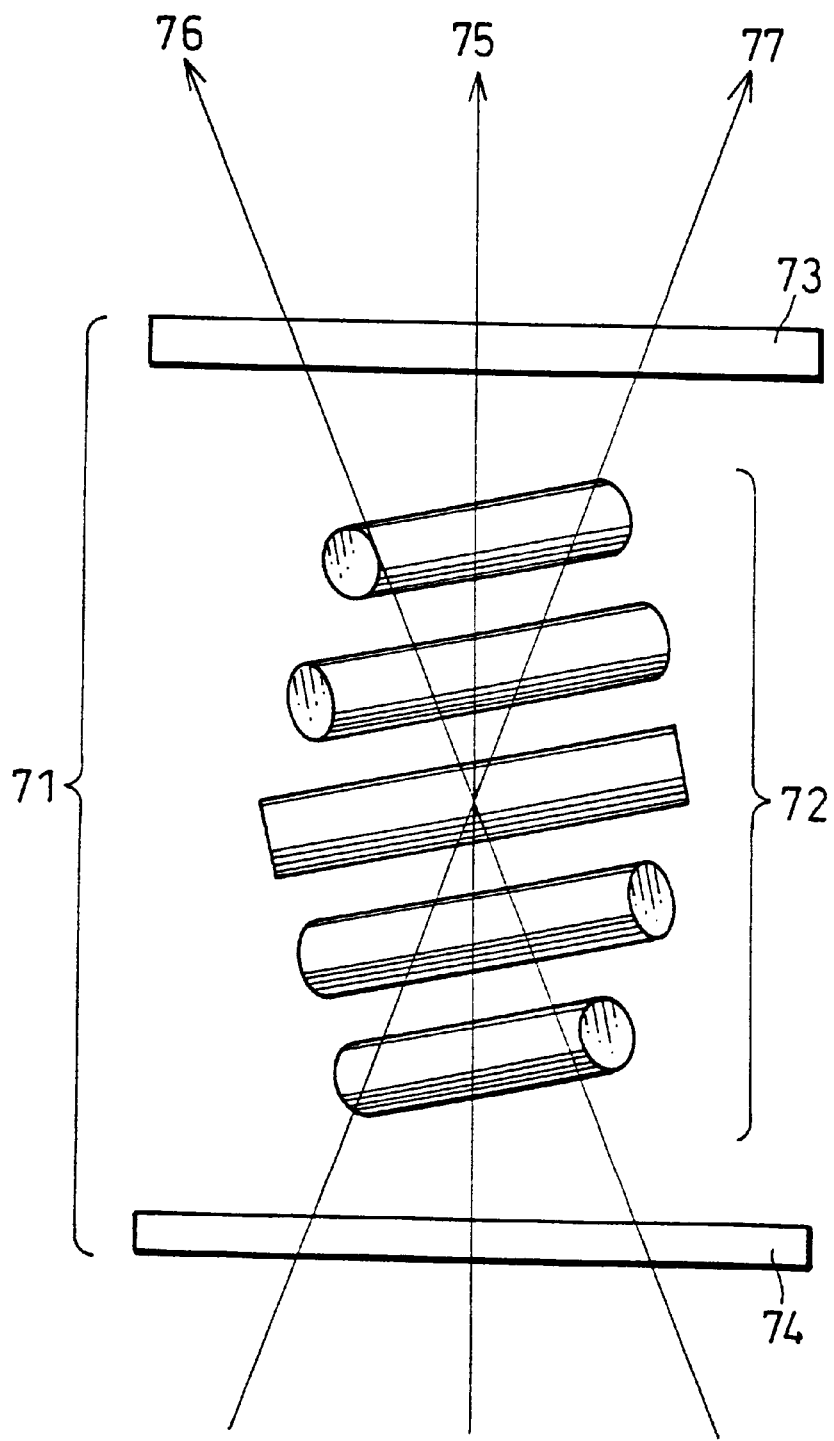
FIG. 13 is a schematic view illustrating a twist alignment of liquid crystal molecules in a TN-type LCD element.

The following description will explain still another embodiment of the present invention, while referring to FIGS. 9 through 10(b). The members having the same structure (function) as those in the above-mentioned embodiment will be designated by the same reference numerals and their description will be omitted.

As shown in FIG. 9, an LCD device (second LCD device) 100 of the present embodiment was arranged so that a ratio between alignment domains 101a and 101b is 17:3 in a translucent region in the pixel substrate 7, and an additional capacitor 102 was provided so that light was blocked by the same thereby not to enter a region along the alignment division border. As shown in FIGS. 10(a) and 10(b), color filter layers 104, 105, and 106 of three colors were formed on a counter substrate 103, and on top of them, an alignment film 107 was formed. Pre-tilt angles of liquid crystal in the vicinity of surfaces of the alignment domains 101a and 101b and the alignment film 107 were set to estimated values of about 5°, about 2°, and about 3°, respectively. Besides, to improve the optical transmittance, an organic interlayer insulating film 109 was directly formed on the pixel substrate 7 without a silicon nitride insulating film 108 provided therebetween, whereas it was formed on the gate line 32a and the additional capacitor 102 with the nitride insulating film 108 provided therebetween.

To increase the aperture ratio, aluminum as a low-resistance wiring material was used to form signal wires, while to enhance luminance, three lights were provided in each of two edges, that is, 6 lights were provided in total. This arrangement was applied to a 20-inch UXGA panel, and a transverse luminance of 200 cd/m², a transverse contrast of 300, consumption power of 45 W, a response velocity of 32 msec were realized, while sufficiently good display was obtained even at a viewing angle of not less than 65° rightward, leftward, or upward, or at a viewing angle of not less than 45° downward.

Note that even using six light sources turned on, a rise of a surface temperature of the LCD device (whose upper limitation is about 20° C.) was controlled not to exceed 15° C.

Regarding the viewing direction, the foregoing descriptions explained, as examples, the cases where the LCD device is placed so that the visibility properties are inferior when viewed in the right-angle-direction. Note that in potable products, such LCD devices are placed usually upside down, so that better properties are obtained when viewed in a direction inclined to a bottom side of the display screen.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device comprising:
   a liquid crystal display element including at least a counter substrate, a pixel substrate, and a liquid crystal layer, wherein:
   said counter substrate has a common electrode, said pixel substrate or said counter substrate having a plurality of color filters;
   said pixel substrate has scanning lines, signal lines, switching elements each being provided in the vicinity of each point of intersection of said scanning lines and said signal lines, and pixel electrodes each being connected with each switching element, each switching element having a gate electrode connected with said scanning line, a source electrode connected with said signal line, and a drain electrode connected with said pixel electrode, each scanning line, signal line and switching element being covered with an interlayer insulating film being composed of an organic film whose optical transmittance is not less than about 95 percent with respect to light which is emitted from a light source and has a peak wavelength in the vicinity of a wavelength band of colors of said color filters, each pixel electrode being provided on each interlayer insulating film; and
   said liquid crystal layer is provided between said counter substrate and said pixel substrate, and is made of liquid crystal whose refractive index anisotropy $\Delta n(450)$ with respect to light with a wavelength of 450 nm and whose refractive index anisotropy $\Delta n(650)$ with respect to light with a wavelength of 650 nm satisfy a condition that a difference $\Delta n(450)-\Delta n(650)$ between the refractive index anisotropies is in a range of 0 to 0.01,
   said liquid crystal display device further comprising:
   a pair of polarizers, each being provided on each side of said liquid crystal display element; and
   at least one phase difference plate provided between said liquid crystal display element and said polarizers, three main refractive indexes na, nb, and nc of an index ellipsoid of said phase difference plate satisfying na=nc>nb at least in a representative layer of the same, either the main refractive index na or nc being parallel with a surface of said phase difference plate, the index ellipsoid being inclined, with a direction of the main refractive index nb being turned clockwise or anti-clockwise around the main refractive index na or nc direction parallel with the surface of said phase difference plate as an axis, so as to shift from a state where the index ellipsoid is parallel with a normal direction of the surface of said phase difference plate to an inclined state.

2. The liquid crystal display device as set forth in claim 1, wherein:
   said pixel substrate further includes junction electrodes each of which connects each pixel electrode and each drain electrode;

each interlayer insulating film is formed so as to cover said switching element, said scanning line, said signal line, and said junction electrode;

said pixel electrode is provided on said interlayer insulating film so that said pixel electrode partly overlap at least either said scanning line or said signal line; and each junction electrode is connected with each pixel electrode through a contact hole piercing said interlayer insulating film.

3. The liquid crystal display device as set forth in claim 2, wherein:

said pixel substrate further includes additional capacitors for holding voltages applied to said liquid crystal layer; and each contact hole is provided above an electrode connected with each additional capacitor or each scanning line.

4. The liquid crystal display device as set forth in claim 1, wherein the liquid crystal is arranged so that a refractive index anisotropy $\Delta n(435)$ of the same with respect to light with a wavelength of 435 nm and a refractive index anisotropy $\Delta n(610)$ of the same with respect to light with a wavelength of 610 nm satisfy a condition that a difference $\Delta n(435)-\Delta n(610)$ between the refractive index anisotropies is not higher than 0.00875.

5. The liquid crystal display device as set forth in claim 1, wherein said color filters have an optical transmittance of not less than 85 percent with respect to at least a light with one peak wavelength among lights which enter through said pixel substrate.

6. The liquid crystal display device as set forth in claim 1, wherein said phase difference plate has a layer made of a compound having discotic structural units, inclination angles of disk planes of the discotic structural units with respect to the surface of said phase difference plate continuously or discontinuously varying in a depth direction of said phase difference plate.

7. The liquid crystal display device as set forth in claim 6, wherein an average of the inclination angles is 15° to 75°.

8. The liquid crystal display device as set forth in claim 1, wherein:

liquid crystal of said liquid crystal layer is aligned so as to twist through an angle of 90°; and a display mode is a normally white mode.

9. A liquid crystal display device comprising:

a counter substrate on which counter electrodes are provided;

a pixel substrate having scanning lines, signal lines, and switching elements each being provided in the vicinity of each point of intersection of said scanning lines and said signal lines, interlayer insulating films and pixel electrodes each being connected with each switching element provided on each interlayer insulating film;

alignment films provided on a surface of said counter substrate and a surface of said pixel substrate, respectively, the surfaces facing each other;

a liquid crystal layer formed by sealing a plurality of liquid crystal molecules between said counter substrate and said pixel substrate;

polarizers provided on said counter substrate and said pixel substrate, respectively;

a light source;

a color filter layer provided either on said counter substrate or on said pixel substrate; and one phase difference plate provided either between said counter substrate and said polarizer or between said pixel substrate and said polarizer, or two phase difference plates, one being provided between said counter substrate and said polarizer, and the other being provided between said pixel substrate and said polarizer;

wherein said interlayer insulating film is an organic film whose optical transmittance is not less than about 95 percent with respect to light which is emitted from said light source and has a wavelength in the vicinity of a peak wavelength of a wavelength band of said color filter layer;

three main refractive indexes na, nb, and nc of an index ellipsoid of said phase difference plate satisfy na=nc>nb at least in a representative layer thereof, either the main refractive index na or nc is parallel with a surface of said phase difference plate, and the index ellipsoid is inclined, with a direction of the main refractive index nb being turned clockwise or anticlockwise around the main refractive index na or nc direction parallel with the surface of said phase difference plate as an axis, so as to shift from a state where the index ellipsoid is parallel with a normal direction of the surface of said phase difference plate to an inclined state; and said alignment films are arranged so that the liquid crystal molecules in a pixel region are aligned so as to be in a plurality of different alignment states, wherein the pixel region has a first domain in which better visibility is obtained from either a top side or a bottom side, and a second domain in which better visibility is obtained from the other side, the first and second domains being domains in the different alignment states respectively, a ratio of the first domain to the second domain being set in a range of 6:4 to 19:1.

10. A liquid crystal display device comprising:

a counter substrate on which counter electrodes are provided;

a pixel substrate having scanning lines, signal lines, and switching elements each being provided in the vicinity of each point of intersection of said scanning lines and said signal lines, interlayer insulating films and pixel electrodes each being connected with each switching element provided on each interlayer insulating film;

alignment films provided on a surface of said counter substrate and a surface of said pixel substrate, respectively, the surfaces facing each other;

a liquid crystal layer formed by sealing a plurality of liquid crystal molecules between said counter substrate and said pixel substrate;

polarizers provided on said counter substrate and said pixel substrate, respectively;

a light source;

a color filter layer provided either on said counter substrate or on said pixel substrate; and one phase difference plate provided either between said counter substrate and said polarizer or between said pixel substrate and said polarizer, or two phase difference plates, one being provided between said counter substrate and said polarizer, and the other being provided between said pixel substrate and said polarizer;

wherein said interlayer insulating film is an organic film whose optical transmittance is not less than about 95 percent with respect to light which is emitted from said light source and has a wavelength in the vicinity of a peak wavelength of a wavelength band of said color filter layer;

three main refractive indexes na, nb, and nc of an index ellipsoid of said phase difference plate satisfy na=nc>nb at least in a representative layer thereof, either the main refractive index na or nc is parallel with a surface of said phase difference plate, and the index ellipsoid is inclined, with a direction of the main refractive index nb being turned clockwise or anti-clockwise around the main refractive index na or nc direction parallel with the surface of said phase difference plate as an axis, so as to shift from a state where the index ellipsoid is parallel with a normal direction of the surface of said phase difference plate to an inclined state;

said alignment films are arranged so that the liquid crystal molecules in a pixel region are aligned so as to be in a plurality of different alignment states; and wherein said phase difference plate is disposed so that in the largest domain among domains differing in alignment in the pixel region, an inclining direction of the liquid crystal molecules in the vicinity of inner surfaces of said alignment films when a voltage is applied by said pixel electrode thereto is opposite to the inclining direction of the index ellipsoid.

11. A liquid crystal display device comprising:

a counter substrate on which counter electrodes are provided;

a pixel substrate having scanning lines, signal lines, and switching elements each being provided in the vicinity of each point of intersection of said scanning lines and said signal lines, interlayer insulating films and pixel electrodes each being connected with each switching element provided on each interlayer insulating film;

alignment films provided on a surface of said counter substrate and a surface of said pixel substrate, respectively, the surfaces facing each other;

a liquid crystal layer formed by sealing a plurality of liquid crystal molecules between said counter substrate and said pixel substrate;

polarizers provided on said counter substrate and said pixel substrate, respectively;

a light source;

a color filter layer provided either on said counter substrate or on said pixel substrate; and one phase difference plate provided either between said counter substrate and said polarizer or between said pixel substrate and said polarizer, or two phase difference plates, one being provided between said counter substrate and said polarizer, and the other being provided between said pixel substrate and said polarizer;

wherein said interlayer insulating film is an organic film whose optical transmittance is not less than about 95 percent with respect to light which is emitted from said light source and has a wavelength in the vicinity of a peak wavelength of a wavelength band of said color filter layer;

three main refractive indexes na, nb, and nc of an index ellipsoid of said phase difference plate satisfy na=nc>nb at least in a representative layer thereof, either the main refractive index na or nc is parallel with a surface of said phase difference plate, and the index ellipsoid is inclined, with a direction of the main refractive index nb being turned clockwise or anti-clockwise around the main refractive index na or nc direction parallel with the surface of said phase difference plate as an axis, so as to shift from a state where the index ellipsoid is parallel with a normal direction of the surface of said phase difference plate to an inclined state;

said alignment films are arranged so that the liquid crystal molecules in a pixel region are aligned so as to be in a plurality of different alignment states; and wherein a refractive index anisotropy $\Delta nl(450)$ of liquid-crystalline material of said liquid crystal layer with respect to light with a wavelength of 450 nm, a refractive index anisotropy $\Delta nl(550)$ of the same with respect to light with a wavelength of 550 nm, a refractive index anisotopy $\Delta nf(450)$ of said phase difference plate with respect to light with a wavelength of 450 nm, and a refractive index anisotropy $\Delta nf(550)$ of the same with respect to light with a wavelength of 550 nm are set so as to satisfy:

$$(\Delta nl(450)/\Delta nl(550)-1)/(\Delta nf(450)/\Delta nf(550)-1)<0.25.$$

12. A liquid crystal display device comprising:

a counter substrate on which counter electrodes are provided;

a pixel substrate having scanning lines, signal lines, and switching elements each being provided in the vicinity of each point of intersection of said scanning lines and said signal lines, interlayer insulating films and pixel electrodes each being connected with each switching element provided on each interlayer insulating film;

alignment films provided on a surface of said counter substrate and a surface of said pixel substrate, respectively, the surfaces facing each other;

a liquid crystal layer formed by sealing a plurality of liquid crystal molecules between said counter substrate and said pixel substrate;

polarizers provided on said counter substrate and said pixel substrate, respectively;

a light source;

a color filter layer provided either on said counter substrate or on said pixel substrate; and one phase difference plate provided either between said counter substrate and said polarizer or between said pixel substrate and said polarizer, or two phase difference plates, one being provided between said counter substrate and said polarizer, and the other being provided between said pixel substrate and said polarizer;

wherein said interlayer insulating film is an organic film whose optical transmittance is not less than about 95 percent with respect to light which is emitted from said light source and has a wavelength in the vicinity of a peak wavelength of a wavelength band of said color filter layer;

three main refractive indexes na, nb, and nc of an index ellipsoid of said phase difference plate satisfy na=nc>nb at least in a representative layer thereof, either the main refractive index na or nc is parallel with a surface of said phase difference plate, and the index ellipsoid is inclined, with a direction of the main refractive index nb being turned clockwise or anti-clockwise around the main refractive index na or nc direction parallel with the surface of said phase difference plate as an axis, so as to shift from a state where the index ellipsoid is parallel with a normal direction of the surface of said phase difference plate to an inclined state;

said alignment films are arranged so that the liquid crystal molecules in a pixel region are aligned so as to be in a plurality of different alignment states; and wherein a refractive index anisotropy $\Delta nl(650)$ of liquid-crystalline material of said liquid crystal layer with respect to light with a wavelength of 650 nm, a refractive index anisotropy $\Delta nl(550)$ of the same with respect to light with a wavelength of 550 nm, a refractive index anisotopy $\Delta nf(650)$ of said phase difference plate with respect to light with a wavelength of 650 nm, and a refractive index anisotropy $\Delta nf(550)$ of the same with respect to light with a wavelength of 550 nm are set so as to satisfy:

$$(\Delta nl(550)/\Delta nl(650)-1)/(\Delta nf(550)/\Delta nf(650)-1)<0.25.$$

13. The liquid crystal display device as set forth in claim 9 or claim 10, wherein division borders for dividing domains differing in alignment are provided above said scanning lines, said signal lines, and additional capacitors which are made of the same material as that of said scanning lines and said signal lines and have light blocking properties.

14. The liquid crystal display device as set forth in one of claims 9, 10, 11, or 12, wherein each interlayer insulating film composed of an organic film is laminated over said scanning lines and signal lines with an inorganic insulating film therebetween, and is laminated directly on said pixel substrate.

* * * * *